(12) United States Patent
Srinivasan et al.

(10) Patent No.: US 9,281,537 B2
(45) Date of Patent: Mar. 8, 2016

(54) METHOD OF FABRICATING THIN FILM ELECTRODES INCLUDING METAL TUBES FILLED WITH ACTIVE MATERIAL

(71) Applicant: Johns Hopkins University, Baltimore, MD (US)

(72) Inventors: Rengaswamy Srinivasan, Ellicott City, MD (US); Jeffrey P. Maranchi, Clarksburg, MD (US); Lance M. Baird, Baltimore, MD (US); Ryan M. Deacon, Ellicott City, MD (US); Arthur S. Francomacaro, Eldersburg, MD (US); Paul J. Biermann, Columbia, MD (US); Craig B. Leese, Sykesville, MD (US); Gary E. Peck, Virginia Beach, VA (US)

(73) Assignee: The Johns Hopkins University, Baltimore, MD (US)

( * ) Notice: Subject to any disclaimer, the term of this patent is extended or adjusted under 35 U.S.C. 154(b) by 291 days.

(21) Appl. No.: 13/947,613

(22) Filed: Jul. 22, 2013

(65) Prior Publication Data
US 2013/0312255 A1    Nov. 28, 2013

Related U.S. Application Data

(62) Division of application No. 12/782,126, filed on May 18, 2010, now Pat. No. 8,574,767.

(60) Provisional application No. 61/179,034, filed on May 18, 2009.

(51) Int. Cl.
*H01M 2/16* (2006.01)
*H01M 4/00* (2006.01)
(Continued)

(52) U.S. Cl.
CPC ............... *H01M 10/04* (2013.01); *H01M 4/04* (2013.01); *H01M 4/0473* (2013.01);
(Continued)

(58) Field of Classification Search
CPC ....... H01M 4/80; H01M 4/666; H01M 4/246; H01M 4/26; H01M 4/0473; H01M 4/661; H01M 4/32; H01M 4/244; H01M 4/04; H01M 10/0436; H01M 10/28; H01M 10/30; H01M 10/04
USPC .......................................................... 29/623.5
See application file for complete search history.

(56) References Cited

U.S. PATENT DOCUMENTS

| 5,569,559 A | 10/1996 | Fauvarque |
| 5,985,485 A | 11/1999 | Ovshinsky et al. |

(Continued)

FOREIGN PATENT DOCUMENTS

| EP | 2037516 | 3/2009 |
| WO | 03/088384 | 10/2003 |

OTHER PUBLICATIONS

Dickey, M.D. et al., "Fabrication of Arrays of Metal and Metal Oxide Nanotubes by Shadow Evaporation," American Chemical Society, ACSNano, vol. 2, No. 4, Mar. 22, 2008, pp. 800-808.

(Continued)

*Primary Examiner* — Sean P Cullen
(74) *Attorney, Agent, or Firm* — Noah J. Hayward

(57) ABSTRACT

A thin film electrode is fabricated from a non-metallic, non-conductive porous support structure having pores with micrometer-range diameters. The support may include a polymer film. A first surface of the support is metalized, and the pores are partially metallized to create metal tubes having a thickness within a range of 50 to 150 nanometers, in contact with the metal layer. An active material is disposed within metalized portions of the pores. An electrolyte is disposed within non-metalized portions of the pores. Active materials may be selected to create an anode and a cathode. Non-metalized surfaces of the anode and cathode may be contacted to one another to form a battery cell, with the non-metalized electrolyte-containing portions of the anode facing the electrolyte-containing portions of the cathode pores. A battery cell may be fabricated as, for example, a nickel-zinc battery cell.

10 Claims, 19 Drawing Sheets

(51) Int. Cl.
| | |
|---|---|
| H01M 4/13 | (2010.01) |
| H01M 4/42 | (2006.01) |
| H01M 4/48 | (2010.01) |
| H01M 4/58 | (2010.01) |
| H01M 4/64 | (2006.01) |
| H01M 4/66 | (2006.01) |
| H01M 4/68 | (2006.01) |
| H01M 4/72 | (2006.01) |
| H01M 4/76 | (2006.01) |
| H01M 6/12 | (2006.01) |
| H01M 10/04 | (2006.01) |
| H01M 4/04 | (2006.01) |
| H01M 4/24 | (2006.01) |
| H01M 4/26 | (2006.01) |
| H01M 4/32 | (2006.01) |
| H01M 4/80 | (2006.01) |
| H01M 10/28 | (2006.01) |
| H01M 10/30 | (2006.01) |
| H01M 4/38 | (2006.01) |
| H01M 4/46 | (2006.01) |
| H01M 4/52 | (2010.01) |

(52) U.S. Cl.
CPC ............ *H01M 4/244* (2013.01); *H01M 4/246* (2013.01); *H01M 4/26* (2013.01); *H01M 4/32* (2013.01); *H01M 4/661* (2013.01); *H01M 4/666* (2013.01); *H01M 4/80* (2013.01); *H01M 10/0436* (2013.01); *H01M 10/28* (2013.01); *H01M 10/30* (2013.01); *H01M 4/38* (2013.01); *H01M 4/42* (2013.01); *H01M 4/46* (2013.01); *H01M 4/52* (2013.01); *H01M 2300/0014* (2013.01); *H01M 2300/0025* (2013.01); *H01M 2300/0045* (2013.01); *H01M 2300/0085* (2013.01); *Y02E 60/124* (2013.01); *Y10T 29/49108* (2015.01); *Y10T 29/49115* (2015.01)

(56) References Cited

U.S. PATENT DOCUMENTS

| | | | |
|---|---|---|---|
| 6,045,942 | A | 4/2000 | Miekka et al. |
| 6,162,530 | A | 12/2000 | Xiao et al. |
| 6,617,072 | B2 | 9/2003 | Venkatesan et al. |
| 7,273,680 | B2 | 9/2007 | Durkot et al. |
| 7,468,221 | B2 | 12/2008 | LaFollette et al. |
| 2008/0166632 | A1 | 7/2008 | Phillips et al. |
| 2009/0042101 | A1 | 2/2009 | McGervey et al. |
| 2009/0297913 | A1 | 12/2009 | Zhang et al. |

OTHER PUBLICATIONS

Buckley et al., Battery in Nanotubes, Apr. 16, 2008, Johns Hopkins University Applied Physics Laboratory, www.jhuapl.edu/newcenter/pressreleases/2008/080416a.asp, accessed: Jul. 22, 2013.

Srinivasan et al., Embeddable Batteries: Taking Shape, Apr. 2010, Johns Hopkins APL Technical Digest, 28, 4, 368-370.

Srinivasan et al., Metal Nanotubes and their Applications in Micro Power Sources, Apr. 2009, ECS Transactions, 16 (26), 73-78.

METHOD OF FABRICATING THIN FILM ELECTRODES INCLUDING METAL TUBES FILLED WITH ACTIVE MATERIAL

CROSS REFERENCE TO RELATED APPLICATIONS

This application is a divisional of prior-filed, co-pending U.S. patent application Ser. No. 12/782,126, filed May 18, 2010 and titled "Thin Film Electrodes Including Metal Tubes Filled With Active Material and Battery Cells, and Methods of Fabrication," which claims priority to and the benefit of U.S. Provisional Patent Application Ser. No. 61/179,034, filed May 18, 2009, the contents of which are incorporated herein by reference in their entireties.

STATEMENT OF GOVERNMENTAL INTEREST

This invention was made with government support under contract number HR0011-06-D-0003 awarded by the Defense Advanced Research Projects Agency (DARPA). The U.S. government has certain rights in the invention.

BACKGROUND

Disclosed herein are relatively thin-film electrodes and battery cells, and methods of fabrication, including non-metallic and electrically non-conductive porous thin films having pores with micrometer range diameters and partially metallized pore walls with a metal thickness within a range of 50 to 150 nanometers, to hold active materials within metallized portions of the pores and an electrolyte within non-metallized portions of the pores.

Conventional thin film batteries are relatively thick, within a range of 500 to 5000 micrometers (μm). Conventional thin film batteries also have high internal resistances, greater than 1,000 Ohms, and correspondingly low current discharge rates, below 1 mA/cm$^2$.

Conventional batteries include metallic and/or carbon support structures to hold energy storing chemicals. The support structures may contribute more than 50% of the mass and volume of the batteries. Since the support structures do not store energy, the added mass and volume of the support structures diminish energy densities and specific energies of the batteries.

A conventional thin film battery cell may include an electron-non-conducting separator between anode and cathode layers to conduce current therebetween. Damage to the separator may cause a short-circuit in the battery, and further increases the mass of the battery.

Materials and thicknesses of conventional thin film batteries also render the batteries relatively inflexible.

Conventional rechargeable batteries include lithium-ion batteries, which have a risk of thermal runaway, which may lead to battery degradation or destruction.

SUMMARY

Disclosed herein are relatively thin-film electrodes and battery cells, and methods of fabrication.

An electrode may include a non-metallic, non-conductive support structure having opposing first and second surfaces and a pore or cavity therethrough defined by a cavity wall that extends between openings through the first and second surfaces. The support structure may include a non-carbon support structure, and may include a polymer, such as a polycarbonate and/or a polyimide.

The electrode may include a metal layer having a surface in contact with the first surface of the support structure.

The electrode may include a metal tube disposed within the cavity and in contact with the cavity wall and the metal layer. The metal tube may include a metal tube wall having a height less than a height of the cavity wall.

A thickness of the metal tube wall may be within a range of approximately 50 to 150 nanometers, and the metal tube may be referred to herein as a nanotube.

A thickness of the support structure and a corresponding height of the cavity wall may be within a range of approximately 1 to 20 micrometers. The metal tube wall height may be within a range of approximately 50% to 80% of the cavity wall height, and may be, for example, approximately 8 micrometers. A diameter of the cavity may be within a range of approximately 4 to 5 micrometers. A thickness of the metal layer may be approximately 1 micrometer.

The electrode may include an electrochemically active material disposed within the metal tube, and an electrolyte disposed within a non-metalized portion of the cavity.

The active material may include one or more of a variety of active materials, including, without limitation, a rechargeable nickel-metal hydroxide, cadmium, or zinc.

The metal tube may include a metal that is compatible with the active battery material. For example, where the active material includes zinc, the metal tube may include a metal that does not substantially accelerate corrosion of zinc, such copper.

The support structure may include a plurality of cavities, each including a corresponding metal tube, an electrochemically active material, and the electrolyte. The support structure may have a cavity density of up to 80%.

A battery cell may include first and second such electrodes, with the non-conductive second surfaces of the corresponding first and second support structures in physical contact with one another, and with the corresponding second surface cavity openings at least partially aligned with one another. The electrodes may be contacted to one another without a physical separator, such as without an electron-non-conducting non-metallic separator, therebetween. A thickness of the battery cell may be within a range of approximately 4 to 20 micrometers.

A method of fabricating a relatively thin film electrode may include contacting a layer of metal to a first surface of a non-metallic support structure, such as by electrochemical deposition.

The support structure may include a second surface opposite the first surface and a cavity defined by a cavity wall that extends between openings through the first and second surfaces.

The method may include metalizing a portion of the cavity to provide a metal tube within the cavity and in contact with the metal layer, such as by electrochemical deposition. The metal tube may include a metal tube wall in contact with the cavity wall and having a height less than a height of the cavity wall.

The method may include depositing an electrochemically active material within the metal tube, and depositing an electrolyte within a non-metalized portion of the cavity, such as by electrochemical deposition.

The support structure may include a relatively thin-film filter membrane, such as a nucleopore filter, to which the metal layer is contacted.

Alternatively, the support structure may be fabricated from a resin, such as a polymer resin, which may include a polyimide resin.

A method of fabricating a non-metallic support structure from a resin may include depositing a metal layer over a removable substrate, spin-coating a polymer resin over a surface of the metal layer to form the non-metallic support structure as a polymer film, masking the polymer film with a cavity-patterned mask, and etching the polymer film in accordance with the mask, such as with plasma etching, to form the cavity. The substrate and the mask may then be removed. An electrode may be fabricated from the remaining support structure and metal layer in accordance with the method of fabricating a relatively thin film electrode summarized above.

A method of fabricating a relatively thin-film battery cell may include fabricating first and second electrodes, as an anode and a cathode, respectively, as summarized above, and contacting second surfaces of the first and second electrodes to one another with the corresponding second surface cavity openings substantially aligned with one another. The electrodes may be sealed along the edges with an organic solvent or laser welding.

Dimensions and materials of the electrode and battery may be as summarized above.

Unlike metals, many polymers do not have an intrinsic ability to conduct electrons or ions. Metalizing the walls of the polymer pores, with one end of the pores sealed against the metal layer and the other end of the pores being un-sealed, allows the porous polymer structure to conduct electrons and to store battery chemicals while preserving flexibility.

Where the diameter of a pore in which energy-storing chemicals reside is on the order of nanometers to micrometers, energy-storing chemical particles are in relatively close proximity to an electron conductor. The proximity to an electron conductor further reduces the internal resistance of the battery. For example, within any part of an electrode, the greatest distance between a current collecting metal tube wall and a battery chemical may be no more than 2 micrometers, and a distance between two electrodes through the electrolyte may be approximately 4 micrometers, which provides relatively short distances for electron/ion transfer within the battery.

A battery cell as disclosed herein may have a relatively low internal resistance, which may permit discharging of the battery cell at a relatively high rate with a relatively small internal voltage drop and substantially negligible heat generation Non-metallic and non-carbon porous support structures disclosed herein may reduce overall mass and volume of an electrode and/or battery cell, and may reduce manufacturing costs. Many polymers are inherently low-density materials, and making them porous further reduces their mass.

Polymer based electrodes may be fabricated in relatively large sheets, which may be cut to shape and bonded using conventional techniques. An electrode sheet may be, for example, approximately 10 micrometer high, and a corresponding battery may be up approximately 20 micrometers thick, with an internal resistance well under one Ohm, and may discharged at a rate of several milliAmps/cm$^2$ to several hundred milliamps/cm$^2$. Such a battery may occupy as little as, or less than $\frac{1}{50}^{th}$ the volume of a conventional thin, low-power battery.

Electrodes and battery cells, as disclosed herein, may be fabricated under ambient conditions, and may be cut, shaped, flexed, and/or stacked, which may permit incorporation within a device to be powered.

Absence of a physical separator between electrodes may reduce internal resistances and mass, and may provide additional flexibility to a battery.

Electrodes and battery cells, as disclosed herein, provide relatively high energy density and high power discharge capabilities.

An electrode as disclosed herein may be designed to be substantially transparent to electromagnetic radiation for a specified range of wavelength.

BRIEF DESCRIPTION OF THE DRAWINGS

The above and other features and advantages will become more readily apparent from the detailed description of example embodiments of the invention, accompanied by the drawings, in which.

DETAILED DESCRIPTION

Figure 1:
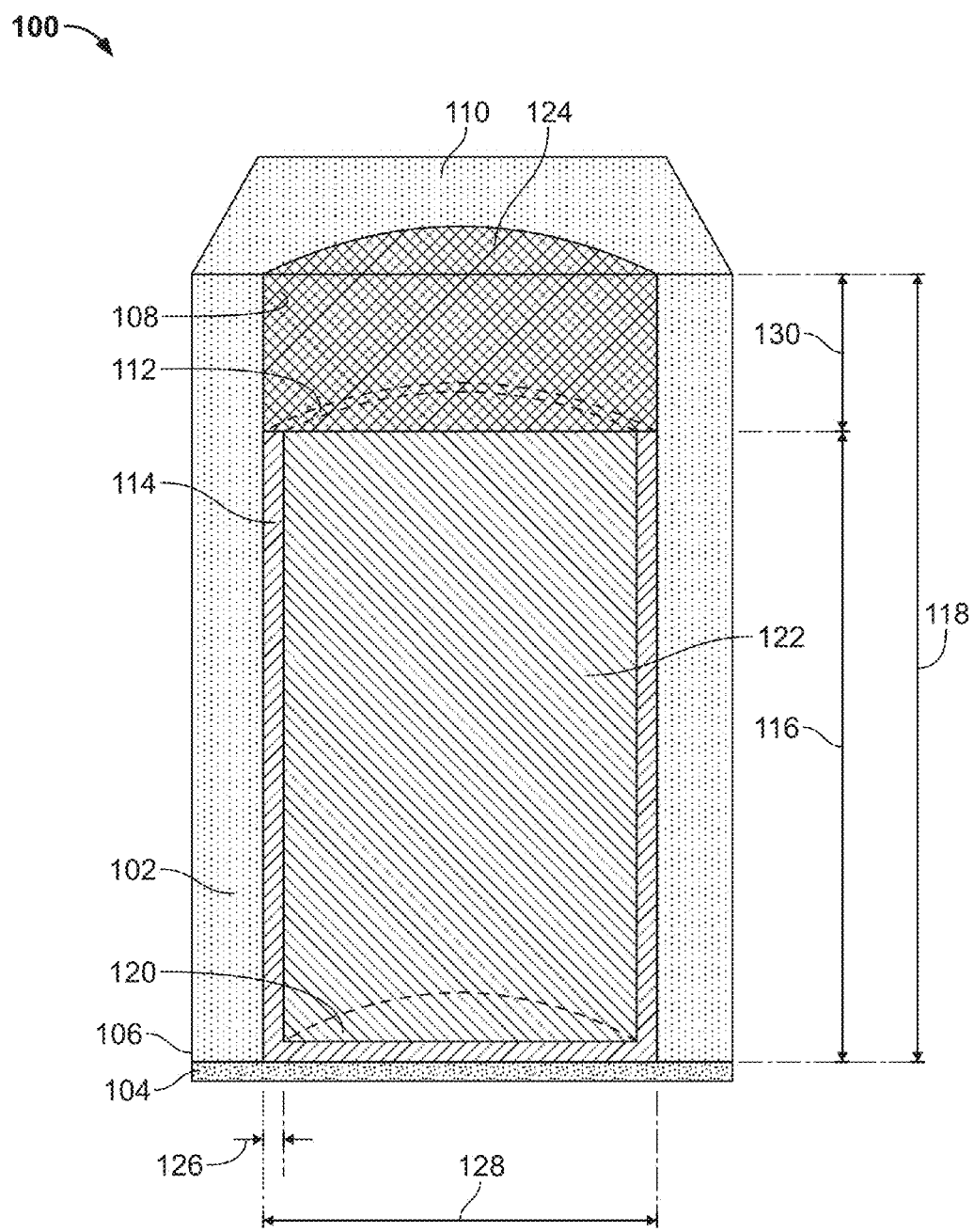
FIG. 1 is a perspective cross-sectional view of an electrode, including a partially metallized cavity within a non-metallic support structure to hold an energy storing material and an electrolyte.

FIG. 1 is a perspective cross-sectional view of an electrode 100.

Figure 2:
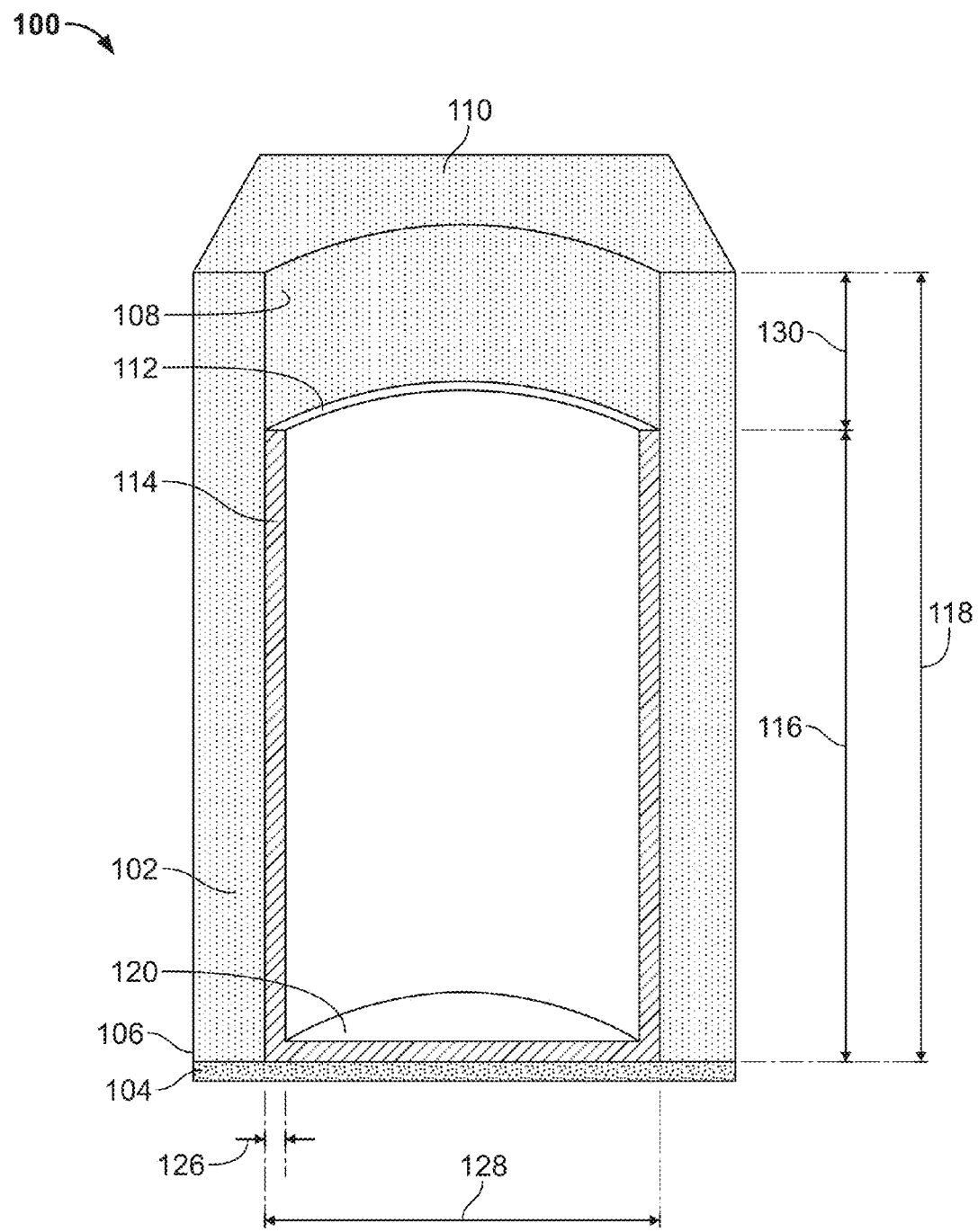
FIG. 2 is a perspective cross-sectional view of the electrode of FIG. 1, wherein an active material and an electrolyte are omitted for illustrative purposes.

FIG. 2 is a perspective cross-sectional view of electrode 100, wherein an active material 122 and an electrolyte 124 of FIG. 1 are omitted for illustrative purposes.

Figure 3:
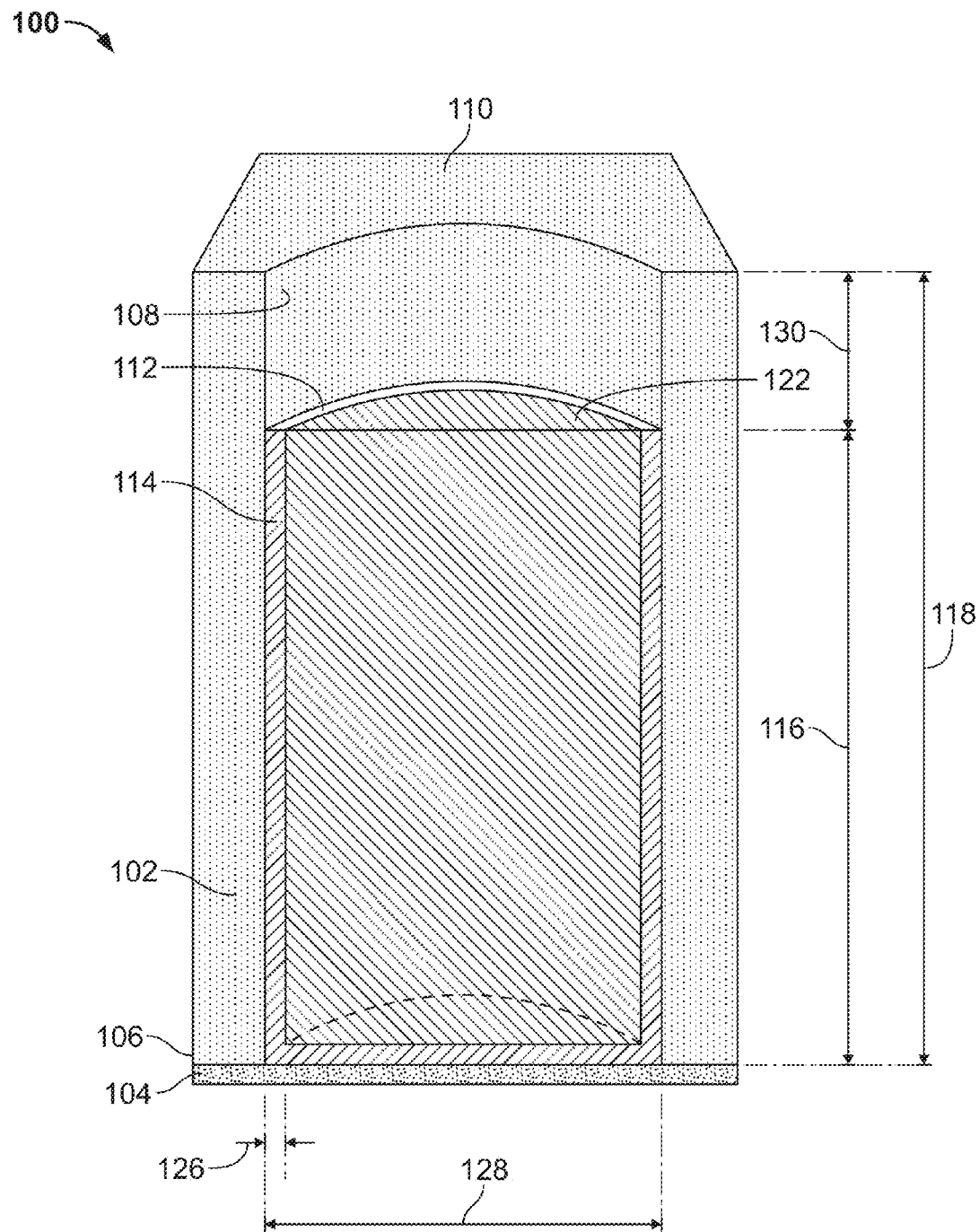
FIG. 3 is another perspective cross-sectional view of the electrode of FIG. 1, wherein the electrolyte is omitted for illustrative purposes.

FIG. 3 is another perspective cross-sectional view of electrode 100, wherein electrolyte 124 is omitted for illustrative purposes.

Electrode 100 includes a support structure or structure 102, which may include a non-metallic and substantially non-electrically-conductive and which may include one or more of a polymer, a polyimide, nylon, polyurethane, polycarbonate polyvinyl chloride (polycarbonate PVC), ceramic, aerogel, silicone, silicon, and a non-carbon material. Structure 102 may be a relatively thin film. Support structure 102 may also be referred to herein as a matrix or a membrane.

Electrode 100 further includes a metal layer 104 in contact with a first surface 106 of structure 102. First surface 106 may also be referred to herein as a conductive surface of structure 102. Metal layer 104 may include a relatively non-reactive, electrically conductive metal, which may include one or more of gold, nickel, and copper.

Structure 102 includes a pore or cavity formed therein, defined by a cavity wall 108. Cavity wall 108 may extend between an opening through first surface 106 of structure 102, and an opening through a second surface 110 of structure 102. Second surface 110 may also be referred to herein as a non-conductive surface.

Electrode 100 further includes a metal tube 112 in contact with metal layer 104, having a metal wall 114 extending from metal layer 104 into the cavity along cavity wall 108. Metal wall 114 has a height 116, which may be within a range of approximately 50% to 80% of a thickness or height 118 of structure 102 and cavity wall 108. Metal tube 112 may include a metal base portion 120 in contact with metal layer 104.

Metal tube 112 may include a substantially non-reactive electrically conductive metal, which may include one or more of nickel, copper, titanium, gold, palladium, platinum, a metal alloy, an electrically conductive metal oxide, such as titanium oxide, ruthenium oxide, and/or a combination of oxides that conduct electricity alone and/or when doped with trace amounts of metals such as platinum, palladium, and/or gold.

Cavity wall 108 and metal wall 114 may have substantially cylindrical shapes or cigar-like shapes.

A portion of the cavity into which metal wall 112 extends is referred to herein as a metalized cavity portion. A remaining portion of the cavity is referred herein to as a non-metalized cavity portion 130. A volume of the metalized portion of the cavity may be within a range of approximately 1% to 80% of a volume of the cavity.

Electrode 100 further includes an active material 122 disposed within metal tube 112 to store and discharge electrical energy.

Active material 122 may include an electrochemically active solid and/or liquid, and may include a metal oxide and/or metal hydroxide such nickel, cadmium, silver, zinc, copper, mercury, and/or lead. Active material 122 may include, for example, one or more of nickel hydroxide $(Ni(OH)_2)$, nickel oxyhydroxide (NiOOH), silver oxide, other metal hydroxide, Zinc (Zn), cadmium, hydrogen, a metal hydride, lithium, lithium iron phosphate, lithium hexafluorophosphate, lithium cobalt oxide, lithium manganese oxide, lithium nickel oxide, lithium nickel cobalt oxide, tin, tin oxide, antimony, antimony oxide, bismuth, germanium and vanadium oxide.

Electrode 100 may correspond to an anode or a cathode depending upon properties of active material 122. Example anode and cathode configurations are disclosed below.

Electrode 100 further includes electrolyte 124 disposed within the non-metalized portion of the cavity. Electrolyte 124 may include an aqueous solution and/or a relatively viscous or gel-like material, such as an ionic liquid, and may include one or more of an aqueous solution of potassium hydroxide (KOH), a non-aqueous solution of hexafluorophosphate, a non-aqueous solution of tetra-alkyl-ammonium salts, and an ionic liquid such as 1-ethyl-3-methylimidazolium hydroxide.

Electrode 100 may be fabricated on one or more of a variety of scales, including, without limitation, a nano-scale or micrometer scale. For example, metal walls 114 may have a thickness 126 within a range of approximately 50 to 150 nanometers, and electrode 100 may be referred to as a nano-electrode. Cavity wall 108 may have a diameter 128 within a range of approximately 1 to 5 μm, and may be, for example, 1, 2, 3, 4, or 5 μm. Thickness or height 118 of structure 102 and cavity wall 108 may be within a range of approximately 1 μm to 20 μm. Metal layer 104 may have a thickness within a range of approximately 1 μm to 1 mm. A height of metal wall 114 may be approximately 8 μm, and a height of the non-metallized portion of the cavity, and of electrolyte 124, may be within a range of 2 μm to 4 μm.

Electrode 100 may implemented as part of a battery system, such as disclosed in one or more examples below.

Figure 4:
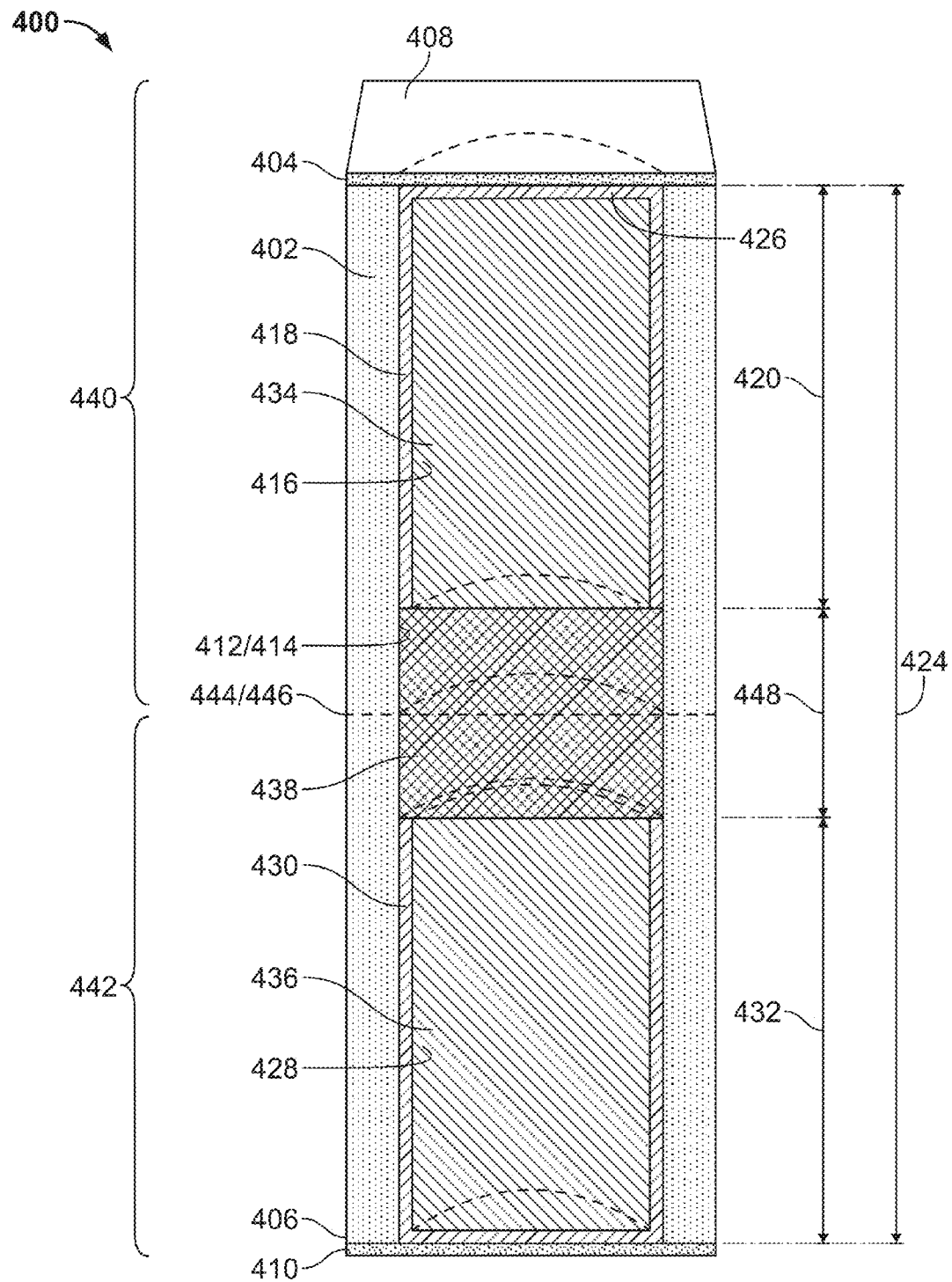
FIG. 4 is a perspective cross-sectional view of a battery cell, including first and second electrodes, each including a partially metallized cavity within a non-metallic support structure to hold an energy storing material and an electrolyte.

FIG. 4 is a perspective cross-sectional view of a battery cell 400, including a structure 402 having opposing surfaces 404 and 406. Structure 402 may include a material such as described above with respect to structure 102.

Battery cell 400 further includes first and second metal layers 408 and 410, respectively, each in contact with a respective one of surfaces 404 and 406.

Structure 402 includes a cavity 412 formed therein, defined by a cavity wall 414. Cavity wall 414 may extend between openings of surfaces 404 and 406.

Battery cell 400 further includes a first metal tube 416, including a metal wall 418 in contact with first metal layer 408 and extending into cavity 412. Metal wall 418 has a height 420, which may be within a range of 25% to 40% of a thickness 424 of structure 402. First metal tube 416 may include a metal base portion 426 in contact with first metal layer 408. A portion of cavity 412 into which first metal wall 418 extends is referred to herein as a first metalized cavity portion.

Battery cell 400 further includes a second metal tube 428 having a metal wall 430 in contact with second metal layer 410 and extending into cavity 412. Metal wall 430 has a height 432, which may be within a range of 25% to 40% of thickness 424. A portion of cavity 412 into which second metal wall 430 extends is referred to herein as a second metalized cavity portion.

Cavity walls 414 and metal walls 418 and 430 may have substantially cylindrical shapes.

Battery cell 400 may include a first active material 434 disposed within first metal tube 416, a second active material 436 disposed within second metal tube 428, and an electrolyte 438 disposed within a non-metalized portion of cavity 412, between metal tubes 416 and 428.

First and second active materials 434 and 436 may each include one or more active materials disclosed above with respect to electrode 100. For example, and without limitation, first active material 434 may include a cathode material, such as nickel hydroxide ($(Ni)OH)_2$) and/or nickel oxyhydroxide (NiOOH), and second active material 436 may include an anode material, such as zinc (Zn) and/or $Zn(OH)_2$ to form a Ni—Zn battery cell, in which the NiOOH in electrode 440 (+ve) is an oxidant and the Zn in electrode 442 (−ve) is a reductant.

NiOOH and $Ni(OH)_2$ are energy-storing battery chemicals. When battery 400 is fully charged, the dominant species is NiOOH. Through electrochemical oxidation of the $Ni(OH)_2$ in an aqueous solution of KOH, the $Ni(OH)_2$ is converted to NiOOH during a discharge reaction, which may be represented as:

$$NiOOH + H^2O + e^- \underset{Discharge}{\overset{Charge}{\rightleftharpoons}} Ni(OH)_2 + OH^- \quad \text{Eq. (1)}$$

Charging and discharging reactions of a zinc-based active material may be represented as:

$$Zn + 2OH^- \underset{Discharge}{\overset{Charge}{\rightleftharpoons}} Zn(OH)_2 + 2e^- \quad \text{Eq. (2)}$$

Metal tubes 416 and 428 may improve conduction within the corresponding electrodes 440 and 442. For example, $Ni(OH)_2$ and NiOOH are relatively poor conductors of electricity, but need to interact with electrons and hydroxide anions to provide or pass electricity. First metal tube 416 may place $Ni(OH)_2$ and NiOOH in relatively close proximity to electrons and hydroxide anions, which may reduce and/or minimize a distance over which current carriers (electrons and ions), need to travel.

A relatively small diameter of cavity 412 may provide a relatively short path between current collectors and active materials. For example, where a diameter of cavity 412 is approximately 4 μm, the greatest distance between a current collector and first active material 434 may be no more than 2 μm.

Electrolyte 438 may have a thickness 448 within a range of approximately 2 μm to 4 μm. This makes the distances over which electrons and ions to travel relatively small, which may reduce an internal resistance.

Metal tubes 416 and 428 may each include a metal that is compatible with a corresponding active material 434 and 436 disposed therein. For example, where first active material 434 includes NiOOH and $Ni(OH)_2$, first metal tube 416 may include nickel.

Where active material 436 includes zinc, metal tube 428 may include a metal that does not accelerate a rate of corrosion of the zinc, such as copper. Where second active material 436 includes a material other than zinc, such as cadmium, second metal tube 428 may include copper and/or other metal. A zinc-based active material may be more environmentally friendly than other metals, such as cadmium Electrodes 440 and 442 may each be separately fabricated and thereafter contacted to one another along corresponding surfaces 444 and 446. An external edge along a junction of surfaces 444 and 446 may be sealed with an electrically non-conductive sealant, such as a polymer sealant, which may serve to hold electrodes 440 and 442 together and/or to substantially prevent evaporation of electrolyte 438.

Because of the non-conducting property of structure 402, and because surfaces of 444 and 446 are not metallized, surfaces 444 and 446 may be physically contacted to one another without a physical separator, such as without an electron and/or ion non-conducting separator therebetween. Absence of a physical separator may reduce an internal resistance of battery 400.

A physical separator may, however, be included, such as to seal an electron sheet to prevent contamination and/or evaporation of an electrolyte prior to fabrication of a battery cell, and/or for other purposes.

Battery cell 400 may be fabricated on one or more of a variety of scales, such as described above with respect to electrode 100. Battery 400 may, for example, have a thickness of approximately 20 μm.

A battery cell may include multiple metalized cavities, such as disclosed below with respect to FIG. 5.

Figure 5:
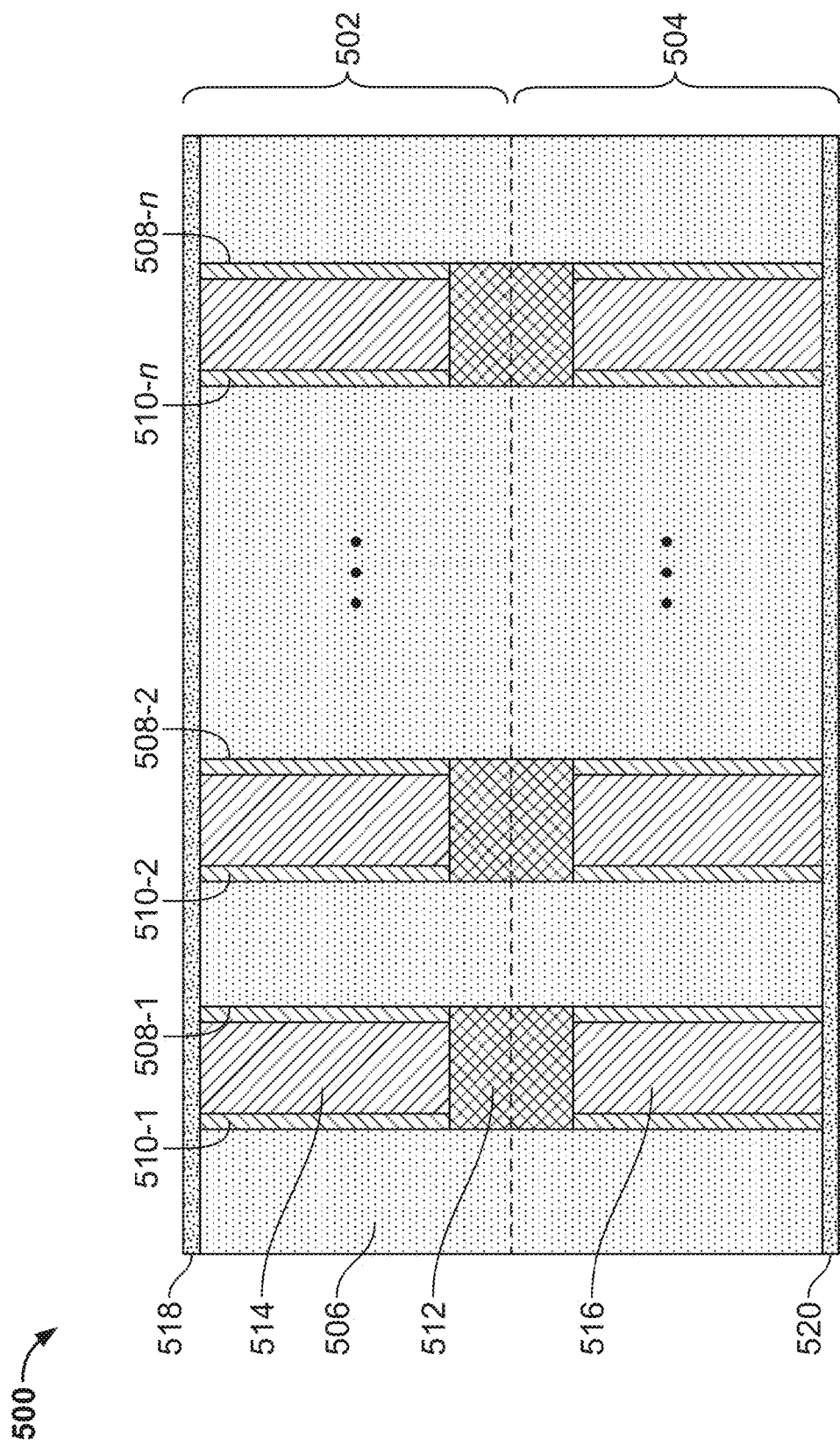
FIG. 5 is a cross-sectional side-view of a battery cell, including first and second electrodes, each including a plurality of partially metallized cavities.

FIG. 5 is a cross-sectional side-view of a battery cell 500, including first and second electrodes, illustrated here as an anode 502 and a cathode 504, respectively.

Anode 502 includes a polymer support 506 having a plurality of cavities 508-1, 508-2 and 508-n and corresponding metal tubes 510-1, 510-2 and 510-n, which may be substantially parallel to one another and may be distributed substantially uniformly over polymer support 506. Anode 502 may have a cavity density within range of approximately 20-30-million cavities per $cm^2$.

Anode 502 may include an electrolyte 512 within a non-metalized portion of cavities 508-1, 508-2 and 508-n.

Cathode 504 may be configured substantially similar to anode 502.

Anode 502 may include an active anode material 514, illustrated here as NiOOH.

Cathode 504 may include an active cathode material 516, illustrated here as zinc.

Battery 500 may be configured to generate a substantially fixed voltage across first and second metal layers 518 and 520.

Multiple battery cells may be stacked to provide an increased voltage level, such as disclosed below with respect to FIG. 6.

Figure 6:
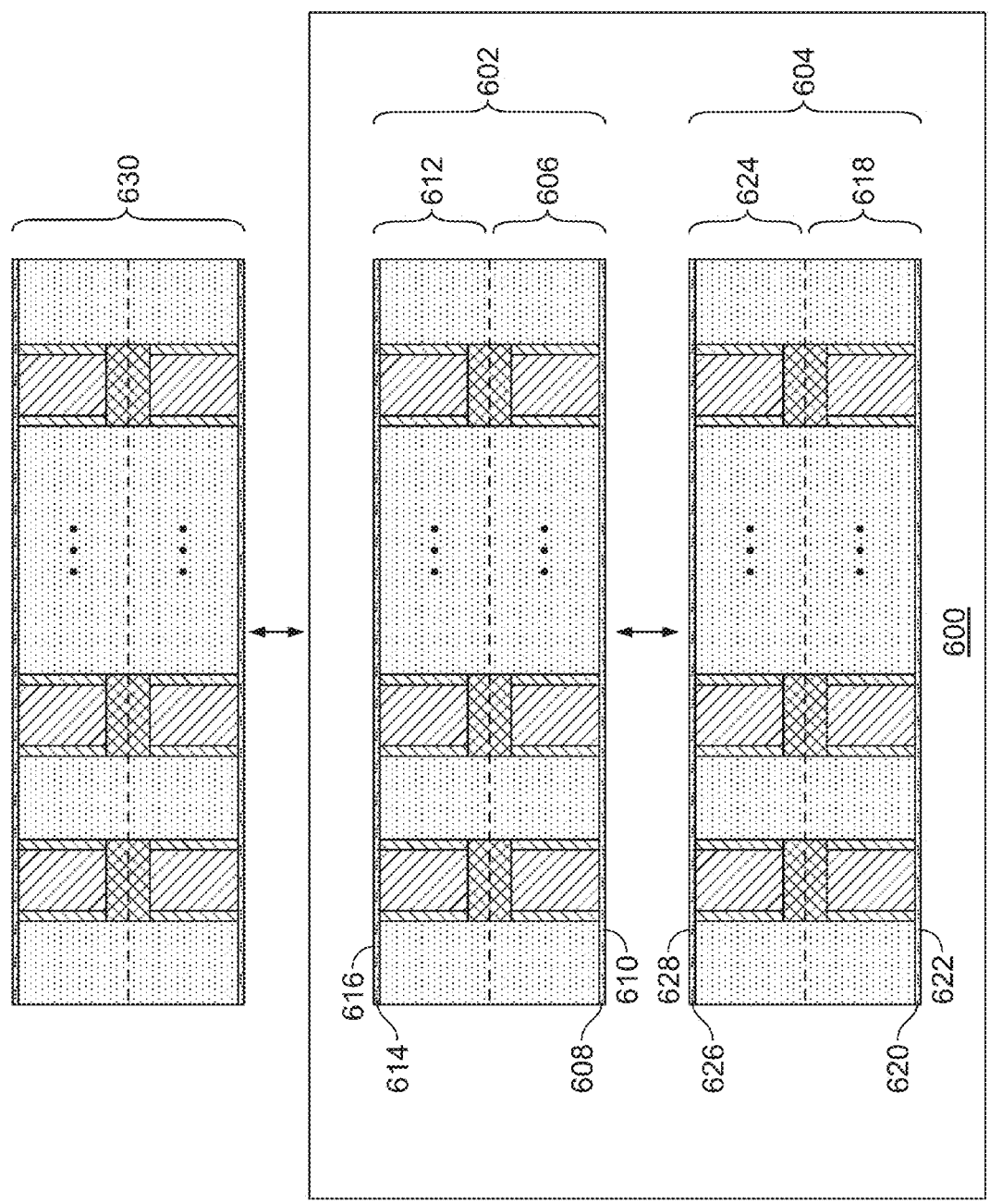
FIG. 6 is a cross-sectional side-view of a battery, including multiple battery cells stacked upon one another.

FIG. 6 is a cross-sectional side-view of a battery 600, including first and second battery cells 602 and 604, which may each be configured as disclosed above with respect to battery cell 500 in FIG. 5.

First battery cell 602 may include an anode 606 and a corresponding anode conducting metal layer 608 having an anode conducting side 610. First battery cell 602 may further include a cathode 612 and a corresponding cathode conducting metal layer 614 having cathode conducting side 616.

Second battery cell 604 may include an anode 618 and a corresponding anode conducting metal layer 620 having an anode conducting side 622. First battery cell 602 may further include a cathode 624 and a corresponding cathode conducting metal layer 626 having cathode conducting side 628.

Battery cells 602 and 604 may be stacked with anode conducting side 610 in contact with cathode conducting side 628.

Battery 600 may include one or more additional stacked battery cells, such as a battery cell 630, to obtain a battery of a desired thickness and/or voltage.

Battery 600 may provide a substantially fixed voltage of nV, where n is an integer number of stacked batteries and V is the voltage of each individual battery cell within battery 600.

In FIGS. 4, 5, and 6, battery cells are illustrated with opposing cavities of first and electrodes substantially aligned with one another. Opposing cavities do not, however, necessarily need to be substantially aligned with one another. Partial alignment will suffice, including partial alignment of a subset of cavities. For example, first and second electrodes may each include millions of cavities. The first and second electrodes will form a battery when one or more cavities of the first electrode are in at least partial alignment with one or more cavities of the second electrode.

In FIGS. 5 and 6, battery cells are further illustrated with first and second electrodes having substantially similar cavity patterns (e.g., cavity diameters, placement, and/or density). Cavity patterns of first and second electrodes do not, however, necessarily need to be substantially similar to one another. For example, anode cavities may have a first diameter and cathode cavities may have a second diameter. This may help to ensure that at least a subset of anode cavities will at least partially align with a subset of cathode cavities. For example, where a diameter of anode cavities differs from a diameter of cathode cavities by a factor of two, approximately 90% of the anode cavities will be at least partially aligned with cathode cavities.

Example methods of fabricating electrodes and batteries are disclosed below.

Figure 7:
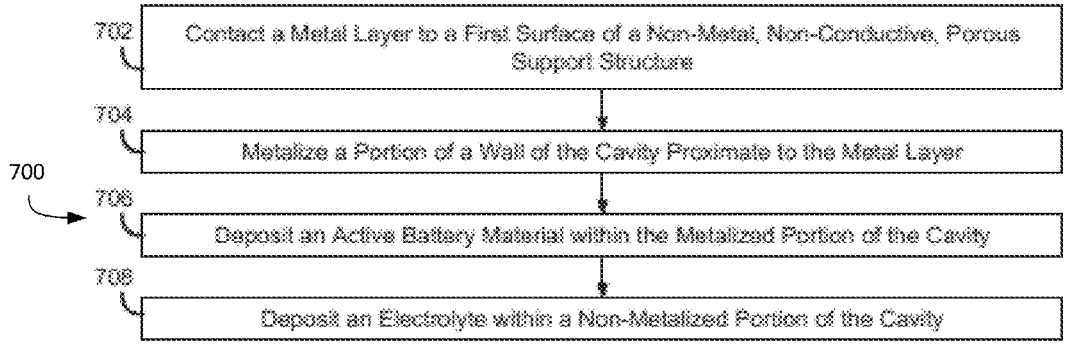
FIG. 7 is a flowchart of a method of fabricating an electrode from a non-metal porous support structure.

FIG. 7 is a flowchart of a method 700 of fabricating an electrode from a non-metal porous support structure. The porous support structure may include a micro pore filter, such as a nucleopore filter described further below. Alternatively, the porous support structure may include a polymer film fabricated as disclosed below with reference to FIG. 9.

At 702, a metal layer is contacted to a first surface of the non-metal, non-conductive, porous structure.

At 704, a portion of a cavity wall proximate to the first metal layer is metalized, such as by electrochemical deposition or electrolysis using an appropriate salt solution.

At 706, an active battery material is deposited within the metalized portion of the cavity, such as by electrochemical deposition.

Referring back to 704, the cavity wall portion may be metalized with a metal that is substantially non-reactive with respect to the active battery material and the structure.

At 708, an electrolyte is deposited within a non-metalized portion of the cavity, to form an electrode, such as described above with respect to FIGS. 1-3.

The structure may include a plurality of cavities, and the metallization at 702, the depositing of the reactive material at 706, and the depositing of the electrolyte at 708 may be performed with respect to all, or substantially all of the cavities.

Method 700 may be implemented to produce an anode and a cathode, which may be joined together to produce a battery, such as described below with respect to FIG. 8.

Figure 8:
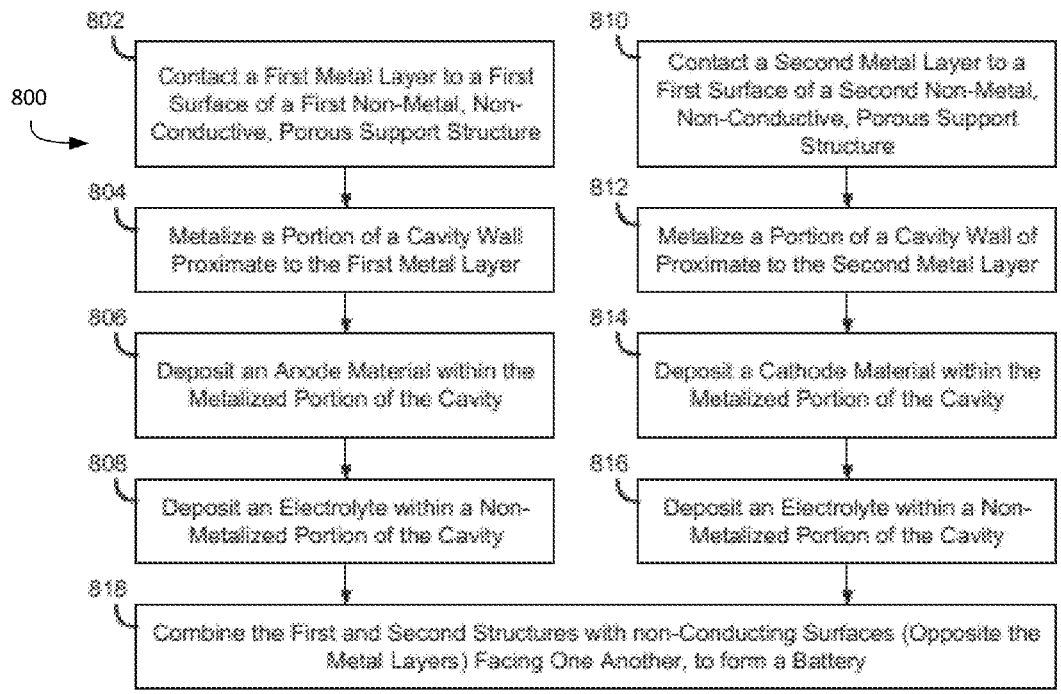
FIG. 8 is a flowchart of a method of a battery cell from a non-metal porous support structure.

FIG. 8 is a flowchart of a method 800 of fabricating a battery from non-metal, non-conductive, porous support structures.

At 802, a first metal layer is contacted to a first surface of a first non-metal, non-conductive, porous support structure, such as described above with respect to 702.

At 804, a portion of a cavity wall of the support structure is metalized, such as described above with respect to 704.

At 806, an active anode battery material is deposited within the metalized portion of the cavity.

At 808, an electrolyte is deposited within a non-metalized portion of the cavity to form an anode.

At 810, a second metal layer is contacted to a first surface of a second non-metal, non-conductive, porous support structure, such as described above with respect to 702.

At 812, a portion of a cavity wall proximate to the second metal layer is metalized, such as described above with respect to 704.

At 814, an active cathode battery material is deposited within the metalized portion of the cavity.

At 816, an electrolyte is deposited within a non-metalized portion of the cavity to form a cathode.

At 818, surfaces of the first and second non-metal porous support structures that are opposite the corresponding first and second metal layers are contacted to one another, with corresponding cavity openings at least partially aligned with one another, to form a battery cell, such as disclosed above with respect to one or more of FIGS. 4 through 6.

Figure 9:
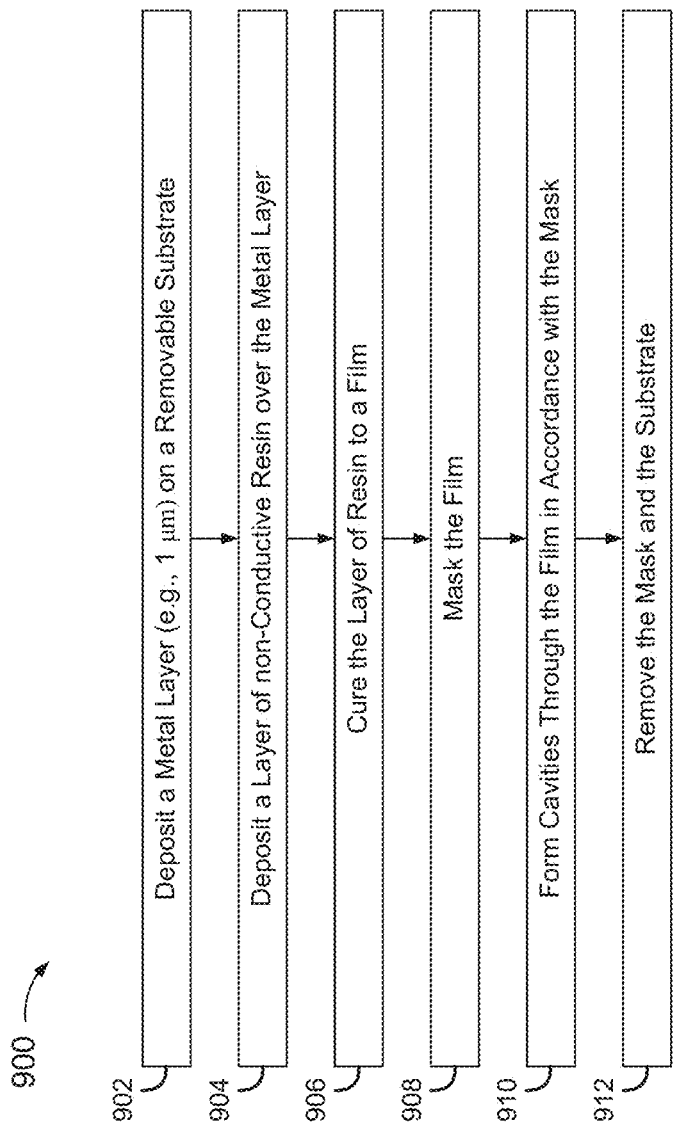
FIG. 9 is a flowchart of a method of fabricating a non-metal porous support structure and metalizing a surface thereof.

FIG. 9 is a flowchart of a method 900 of fabricating a non-metal porous support structure, and metallizing a surface thereof. Method 900 is described below with respect to FIGS. 10 through 14. FIGS. 10-14 are graphic illustrations of example fabrication stages of an electrode. Method 900 is not, however, limited to the examples of FIGS. 10-14.

Figure 10:
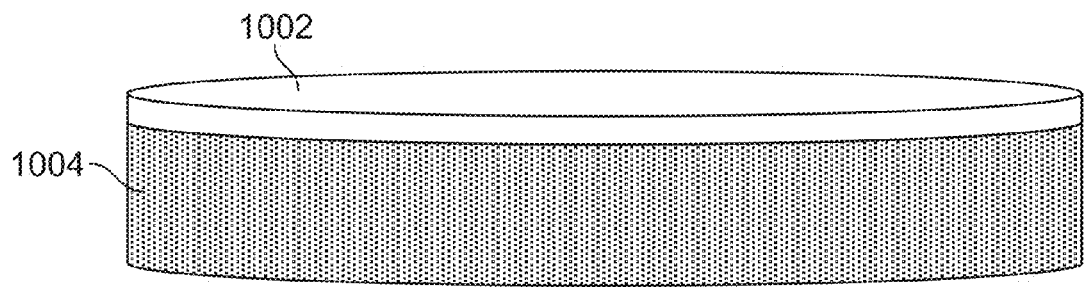
FIG. 10 is a perspective view of a structure including a metal layer disposed over a removable substrate.

At 902, metal layer is deposited over a removable substrate, illustrated in FIG. 10 as metal layer 1002 and substrate 1004. Metal layer 1002 may correspond to metal layer 104 in FIGS. 1-3, and may have a thickness within a range of approximately 1 μm to 1 mm. Substrate 1004 may include, for example, one or more of silicon oxide, aluminum oxide and co-fired alumina.

At 904, a relatively thin layer of a substantially non-conductive resin, such as a non-conductive polyimide resin, is deposited over the metal layer. The resin may be spin coated over the metal layer.

Figure 11:
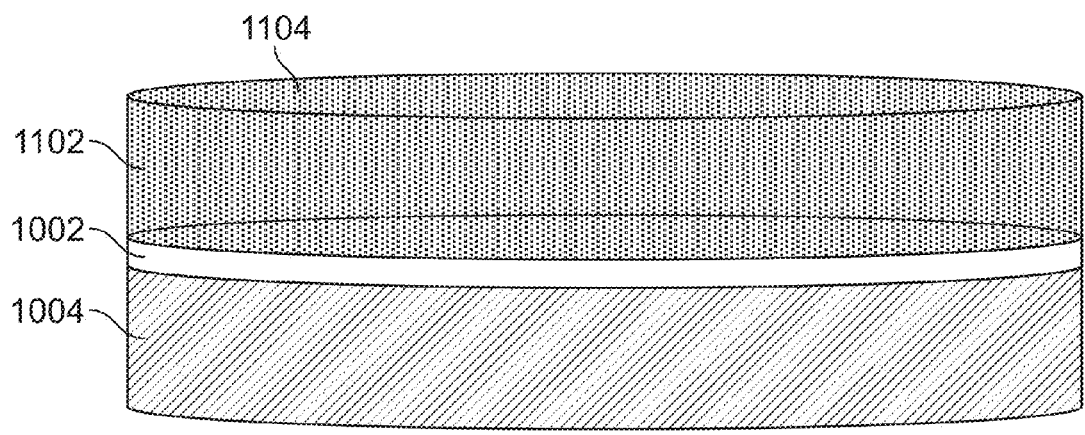
FIG. 11 is a perspective view of the structure of FIG. 10, including a polymer film disposed over the metal layer.

At 906 the resin is cured to a relatively thin film, illustrated in FIG. 11 as a thin film 1102, which may correspond to support structure 102 in FIGS. 1-3.

Figure 12:
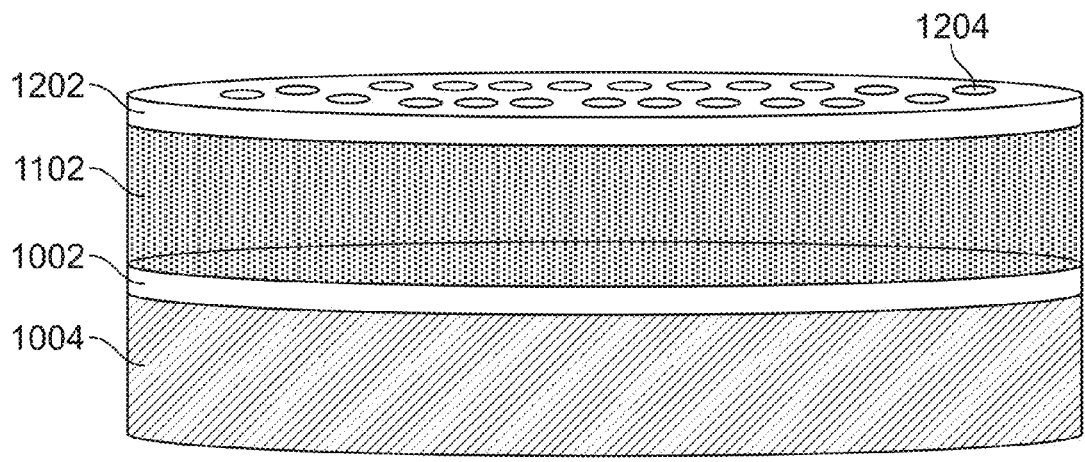
FIG. 12 is a perspective view of the structure of FIG. 11, including a mask disposed over the polymer film.

At 908, a mask is applied over the film, illustrated in FIG. 12 as a mask 1202. Mask 1202 includes openings 1204 therethrough.

Figure 13:
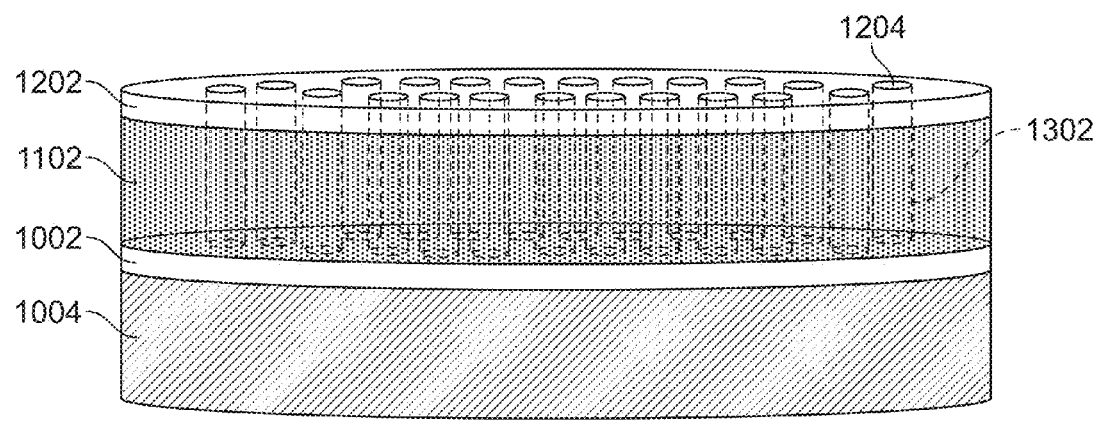
FIG. 13 is a perspective view of the structure of FIG. 12, including cavities etched through the polymer film in accordance with the mask.

At 910, cavities are formed through the film in accordance with the openings through the mask. This is illustrated in FIG. 13 with cavities 1302, which may correspond to the cavity defined by the cavity wall 108 in FIGS. 1-3. Cavities 1302 may be formed by plasma-etching.

Figure 14:
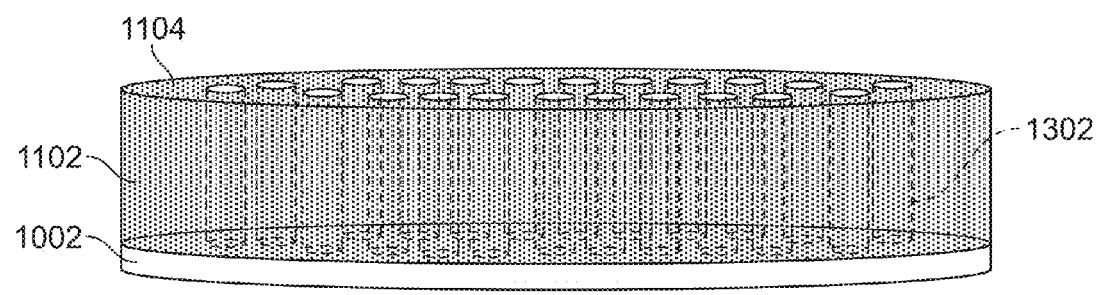
FIG. 14 is a perspective view of the structure of FIG. 13, wherein the mask and the removable substrate have been removed, such as by etching.

At 912, the substrate and the mask are removed or etched away to provide a substantially non-conductive support structure having a plurality of cavities between first and second surfaces, and a metal layer deposited over the first surface, such as illustrated in FIG. 14.

Cavities 1302 in FIG. 14 may thereafter be metalized and filled with an active battery material and electrolyte, such as described in one or more examples herein. After the walls of cavities 1302 are metalized, if support structure 1102 were removed, the metal walls may appear as tubes having a wall thickness in a nanometer range, such that a battery formed therefrom is referred to herein as a nanotube battery.

Metallization of cavity walls, as disclosed herein, may be preceded by sensitizing the cavity walls, such as to improve adherence of the metal to the cavity walls. Sensitizing may include contacting a support structure, such as second surface 110 and the cavity defined by the cavity wall 108 in FIG. 1, with an aqueous solution of tin chloride followed by an aqueous solution of palladium chloride, and thereafter rinsing and cleaning the support structure. After sensitizing, electrolysis may be performed using an appropriate salt solution to metalize the cavity walls.

Sensitizing may be performed selectively, depending upon a type of metal to be deposited. For example, it has been observed that tin-palladium sensitization may be useful for copper deposition over a polyimide support structure. For nickel deposition over a polyimide support structure, tin-palladium sensitization may be omitted.

Figure 15:
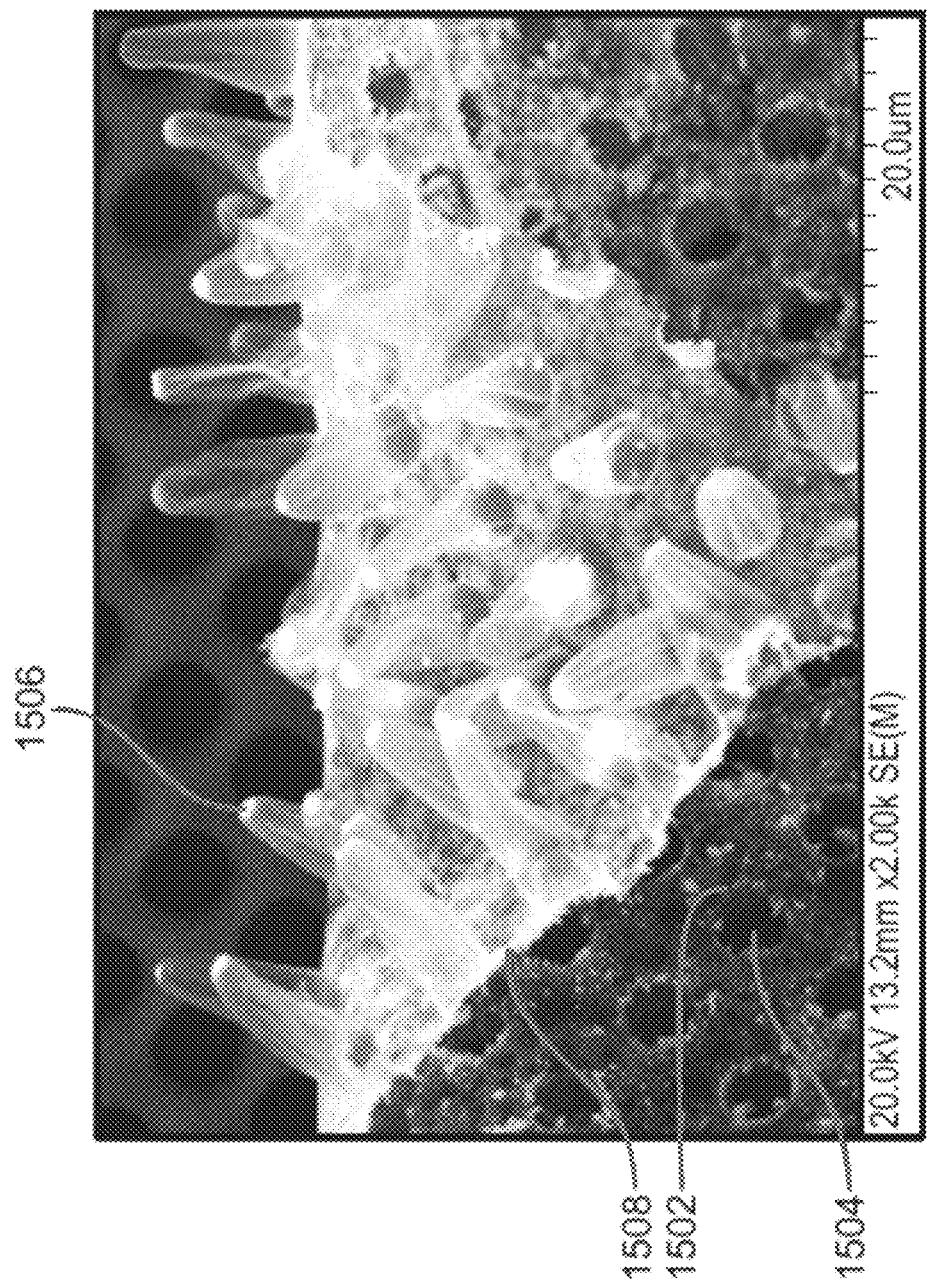
FIG. 15 is a scanning electron microscope (SEM) (magnification ×2000) generated image of a polyimide support structure having cavities in which copper is deposited.

Metallization of cavity walls may result in metallization of other portions of a support structure, such as second surface 110 in FIG. 1, as illustrated in FIG. 15.

FIG. 15 is a SEM image (magnification ×2000), of a polyimide support structure 1502 having cavities 1504 in which copper is deposited. The copper deposition resulted in a layer of copper over a surface of support structure 1502. For illustrative purposes, a portion 1508 of the copper layer was peeled back from the surface of support structure 1502, which pulled copper tubes 1506 from cavities 1504. Copper tubes 1506 appear relatively transparent due to the 20-kV-energy electron passing though the approximately 50-nm thickness of the copper.

One or more techniques may be employed to avoid metalizing the surface of the support structure 1502. For example, in FIG. 11, an additional layer of material may be deposited over a surface 1104 of support structure 1102. Surface 1104 may correspond to second surface 110 in FIG. 1. The additional layer may be formed with the same material used for support structure 1102.

Mask layer 1202 in FIG. 12 may then be placed over the additional layer, and cavities 1302 in FIG. 13 may be formed through the additional layer and layer 1102. Thereafter, cavities 1302 may be metallized, such as described in one or more examples above, and the additional layer may thereafter be removed from support structure 1102. Such a technique substantially precludes metallization of surface 1104.

Experimental Results

Thin film electrodes have been fabricated with polycarbonate structures and with polyimide structures. Structural and chemical properties of the electrodes were evaluated with scanning electron microscope (SEM), energy-dispersive X-ray spectroscopy (EDS), and X-ray photoelectron spectroscopy (XPS) techniques. Electrochemical and power source properties were evaluated with charge-discharge techniques. A summary of features are provided in Table 1 below.

TABLE 1

| Membrane Type | Polycarbonate (nucleopore) | Polyimide |
|---|---|---|
| Membrane Thickness | 10 μm | 10 μm |
| Pores: Diameter, Height, Density | 5 μm 10 μm 4% | 4 μm 10 μm 40% |

TABLE 1-continued

| Membrane Type | Polycarbonate (nucleopore) | Polyimide |
|---|---|---|
| Pore Wall Metal: Cathode, Anode | Ni, Cd | Ni, Cu |
| Pore Walls: Thickness, Height | 150 nm 8 μm | 50 nm 8 μm |
| Active Material: Cathode, Anode | Ni(OH)$_2$, Zn | Ni(OH)$_2$, Zn |
| Active Material: Diameter, Height | ~5 μm 8 μm | ~4 μm 8 μm |
| Discharge Current and Cycles | 0.125 mA/cm$^2$ @1.25 V >200 charge-discharge cycles | 1.0 to 1.5 mA/cm$^2$ @1.25 V >100 charge-discharge cycles |

Polycarbonate Based Electrodes

Polycarbonate based electrodes were fabricated in accordance with method 700, from a commercially available polycarbonate membrane known as a nucleopore filter.

A nucleopore filter is micro-filter fabricated from a plastic membrane, such as a polycarbonate membrane, in which pores of several micrometers wide are created. The pores may be created by radiating the membrane to weaken areas of the plastic, which can be removed with acid or other chemicals.

Thin film electrodes have been fabricated with a nucleopore filter having a 4% pore density (i.e., four percent of the surface has pores), and 5 μm pore diameters. The electrodes were fabricated from 1 inch diameter portions of the nucleopore membrane. A layer of nickel, approximately 0.5-μm thick, was deposited on a first surface of the membrane. Nickel vapor was deposited over a second surface of the membrane to metalize the pores.

A battery cell constructed from the polycarbonate based electrodes had a thickness of 20-μm, generated 125-μA/cm$^2$, and charged and discharged in excess of 200 times. Features of the battery cell are summarized in Table 1 below.

Over time, it was observed that the nickel layer delaminated from the polycarbonate membrane. This may indicate that the nickel layer did not sufficiently seal the pores, which may have permitted the aqueous electrolyte to leak, which may have caused the delamination.

Polycarbonate may not be sufficiently stable in alkali, which may reduce a shelf life of a polycarbonate membrane based battery.

Polyimide Based Electrodes

Polyimide based electrodes were fabricated in accordance with methods 900 and 700.

Sensitization was performed for copper electrodes as described above.

FIGS. 16 through 21 are scanning electron microscope (SEM) images of features of the polyimide membrane based electrodes.

Figure 16:
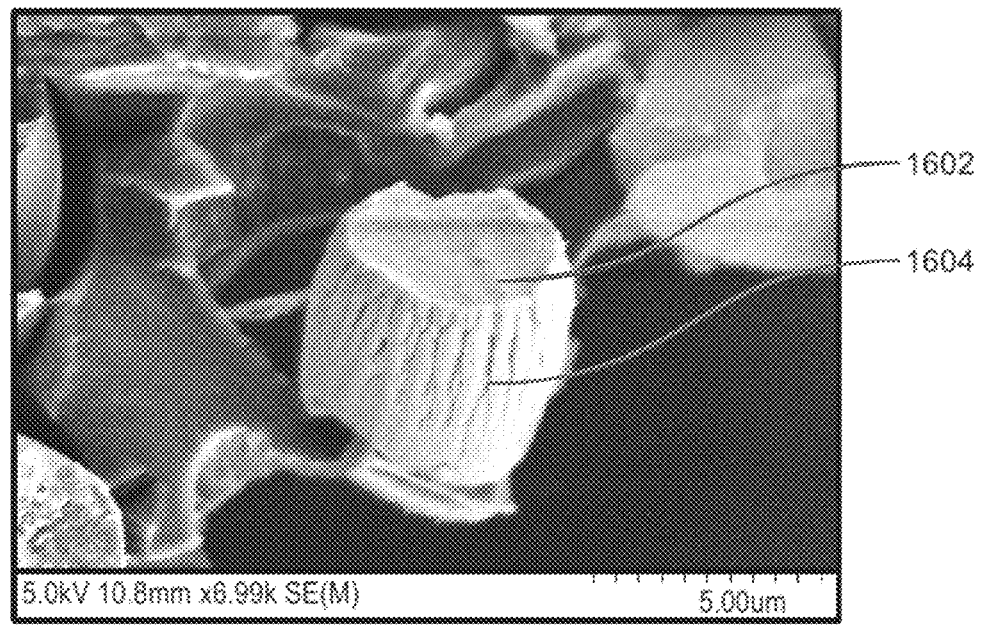
FIG. 16 is a SEM image (magnification ×7000), of a 4 μm diameter Ni(OH)$_2$ cylinder within a nickel tube having a wall thickness of approximately 50 nm.

FIG. 16 is a SEM image (magnification ×7000), of a 4 μm diameter Ni(OH)$_2$ cylinder 1602, within a nickel tube 1604 having a wall thickness of approximately 50 nm.

Figure 17:
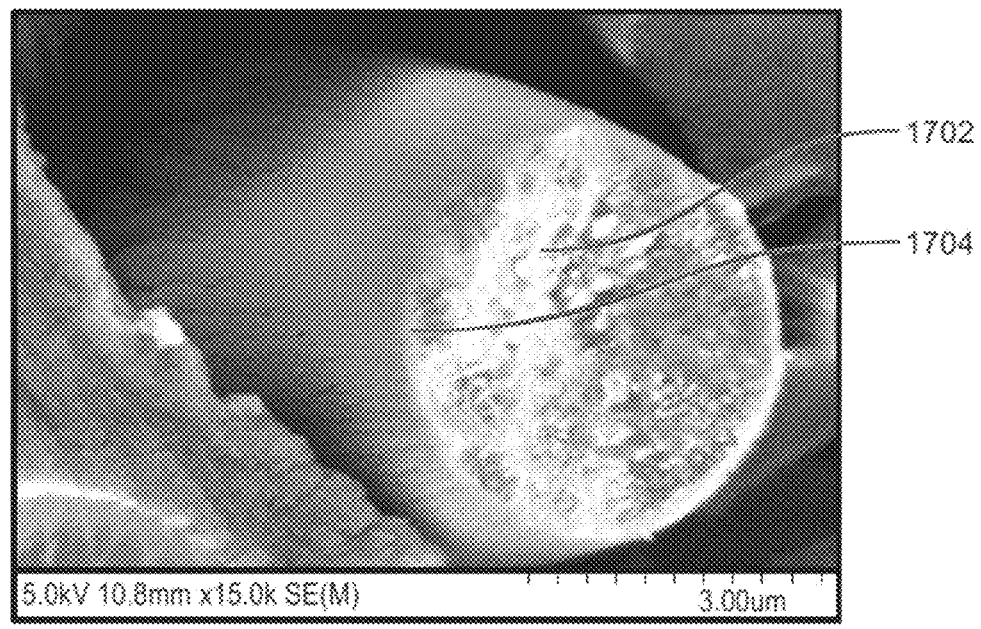
FIG. 17 is a SEM image (magnification ×15,000), of the metal cylinder and nickel tube of FIG. 16.

FIG. 17 is a SEM image (magnification ×15,000), of a 4 μm diameter Ni(OH)$_2$ cylinder 1702, within a nickel tube 1704 having a wall thickness of approximately 50 nm.

FIG. 17 is a SEM-generated image (magnification ×15, 000) of cylinder 1602 and nickel tube 1604.

In FIGS. 16 and 17, surrounding polyimide material was removed for illustrative purposes.

FIGS. 16 and 17 illustrate the precision with which deposition may control a height and diameter of an active material (e.g., Ni(OH)$_2$), relative to dimensions of a metallized cavity wall.

Figure 18:
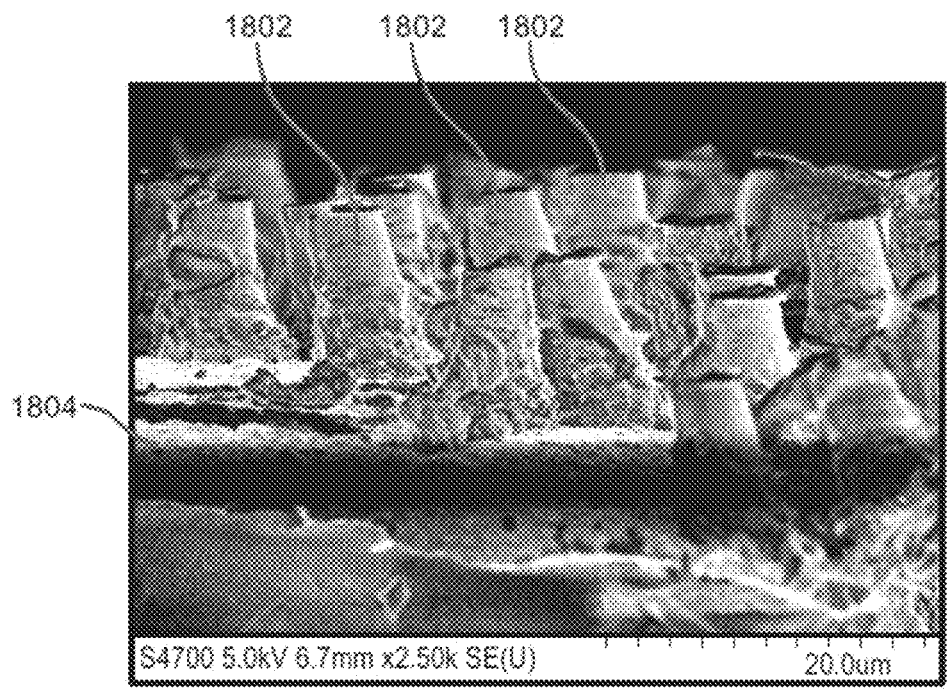
FIG. 18 is a SEM image of an array of nickel tubes having diameters of approximately 5 μm, extending from a metal layer.

FIG. 18 is a SEM image of an array of nickel tubes 1802 (~5 μm in diameter), extending from a metal layer 1804. In FIG. 18, surrounding polyimide material was removed for illustrative purposes.

Figure 19:
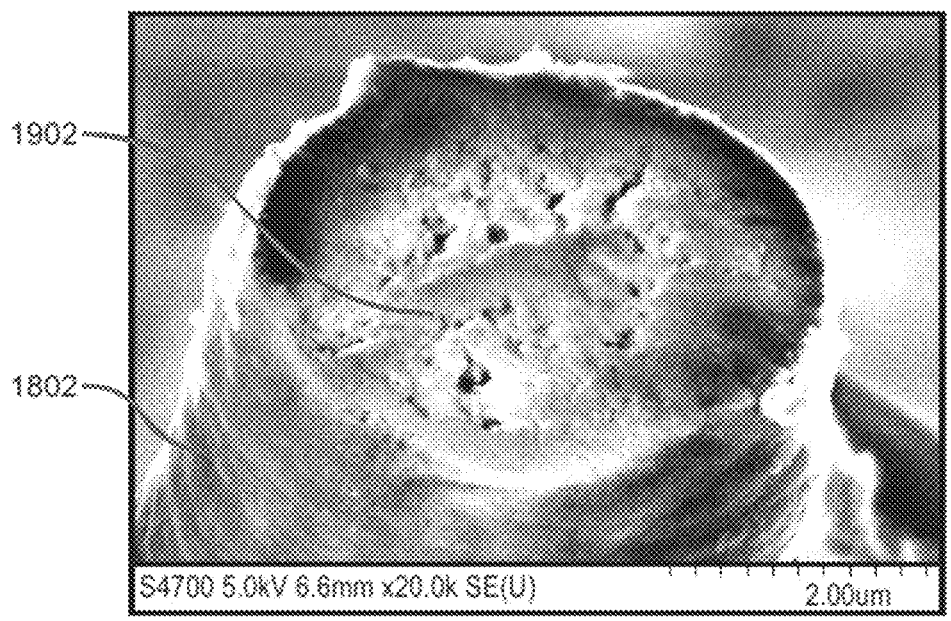
FIG. 19 is a SEM image directed into a nickel tube of FIG. 18 in which an active material is deposited.

FIG. 19 is a SEM image directed into one of nickel tubes 1802 in which an active material 1902 ($Ni(OH)_2$), was deposited by cathodic deposition of the salt from an aqueous solution 2.0 M $Ni(NO_3)_2$/1.0M $NaNO_2$. The electrochemical procedure used to impregnate metal tubes with $Ni(OH)_2$, resulting in nickel tubes 1802, is similar to procedures used to make nickel electrodes for conventional batteries, such as nickel cadmium, nickel-zinc, nickel-metal hydride, and nickel-hydrogen.

Polyimide based electrodes were evaluated to confirm the metals therein, as described further below.

Figure 20:
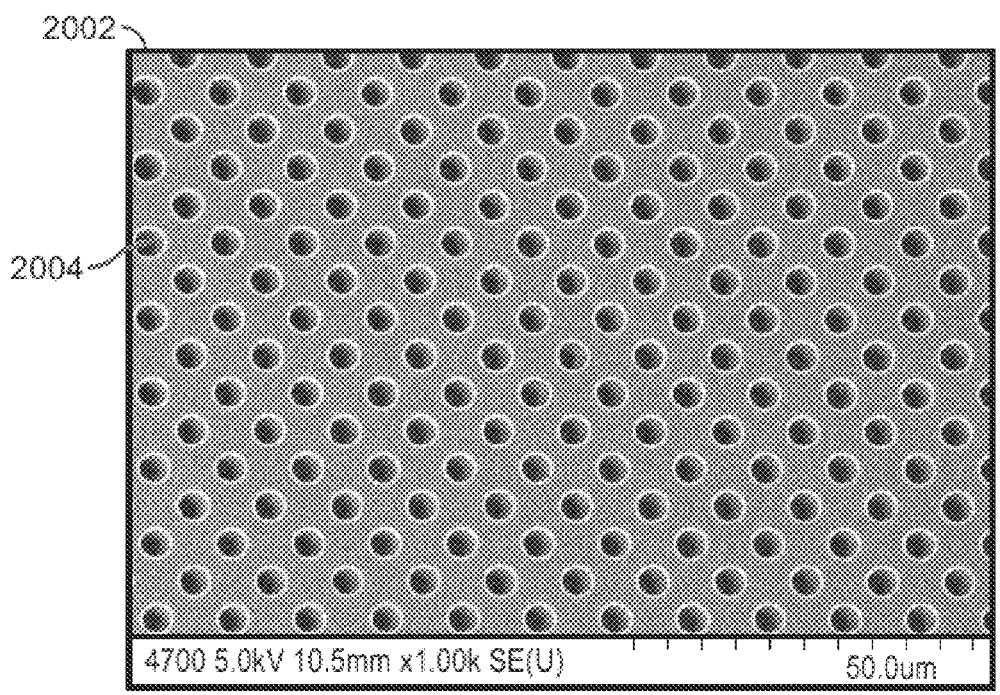
FIG. 20 is a SEM image (magnification of ×1000), of a polyimide sheet having metallized pores with approximately 3×10$^6$ pores/cm$^2$.

FIG. 20 is a SEM image (magnification ×1000), of a polyimide sheet 2002 having metallized pores 2004 with approximately $3×10^6$ pores/cm$^2$.

Figure 21:
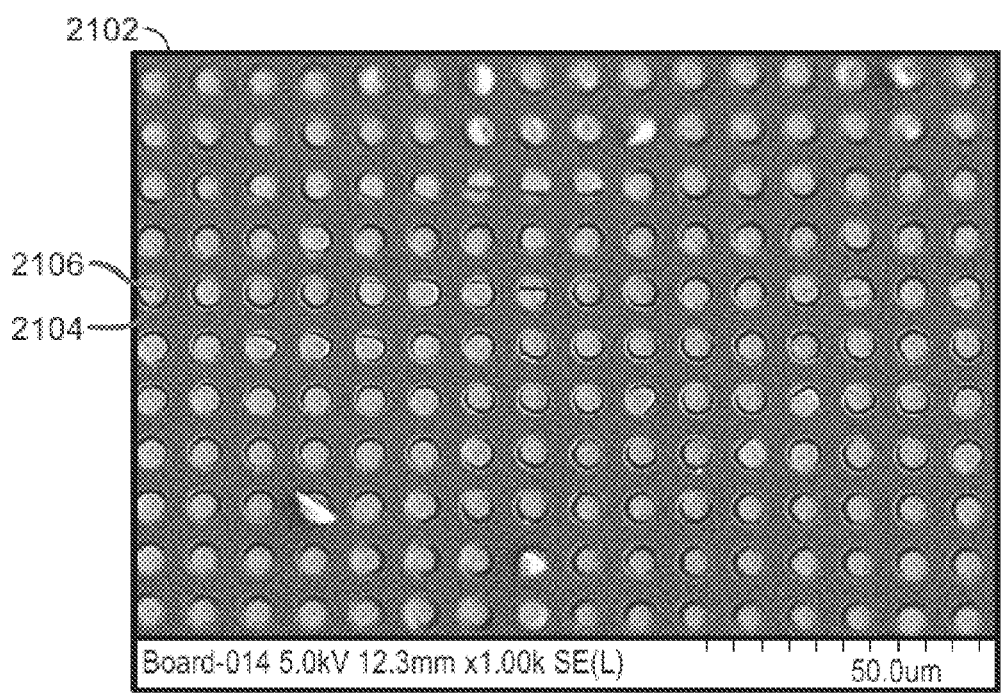
FIG. 21 is a SEM image (magnification ×1000), of the polyimide sheet of FIG. 20, wherein the metalized pores include an active material.

FIG. 21 is a SEM image (magnification ×1000), of a polyimide sheet 2102 having metallized pores 2104 with active material 2106 ($Ni(OH)_2$) therein. The farthest distance between the relatively poorly conducting active material 2602 and an electrical conductor (i.e., metallized pores 2104) is no more than 2 μm.

The metallized pore walls effectively reduce the internal resistance of the cells without adding significant mass or volume, and without substantially impacting a flexibility of the electrode.

FIG. 21 illustrates a uniformity with an active material may be deposited within metalized cavities.

SEM images of nickel-based electrodes subsequent to the approximately 100 discharge and recharge cycles show that the active chemicals remained inside the nickel tubes.

Polyimide based electrodes showed suitable sealing characteristics.

With respect to zinc-based electrodes, it was observed that zinc metallization of pore walls was not always uniform. This may have been related to surface tension or wetability of the metallized pores with the zinc deposition solution.

An electrode for which substantially all of the pores were sufficiently metallized with zinc, was coupled with a nickel electrode to form a Ni—Zn battery cell having a cross-sectional area of 1.23 cm$^2$, a thickness of 20 μm, and a volume of 2.46 mm$^3$ (2.46×10$^{-6}$ L).

The battery cell was charged, and repeatedly discharged and recharged for approximately 100 cycles. Discharge characteristics are provided below with respect to FIGS. 22 and 23. The discharge characteristics of FIGS. 22 and 23 were collected under forced discharge conditions at a rate of 2 mA in FIG. 22, and at a rate of 1 mA in FIG. 23.

Figure 22:
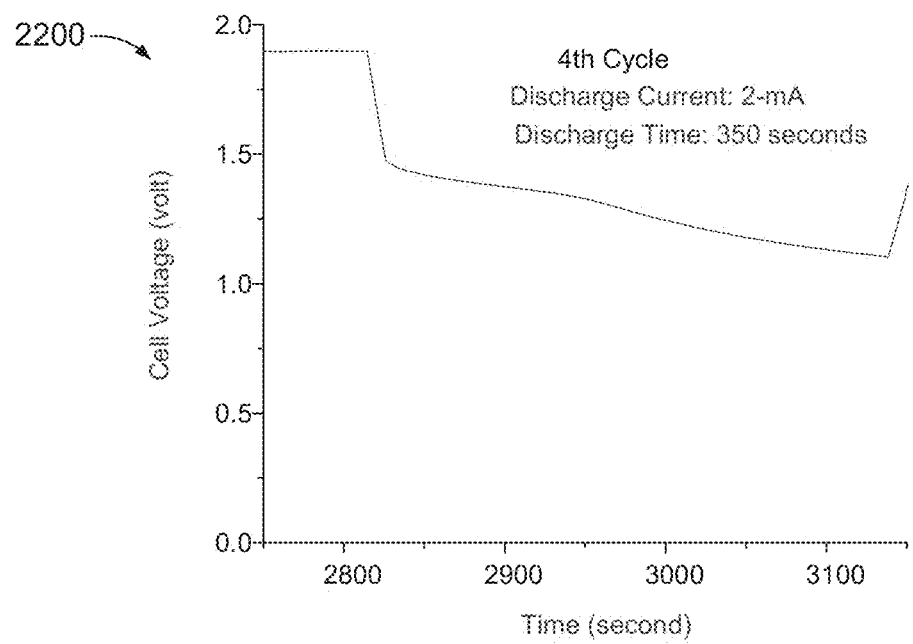
FIG. 22 is a graph of a discharge curve for a fourth discharge cycle of a thin-film Ni—Zn battery.

FIG. 22 is a graph 2200 of a discharge curve 2202 for a fourth discharge cycle of the Ni—Zn battery.

Figure 23:
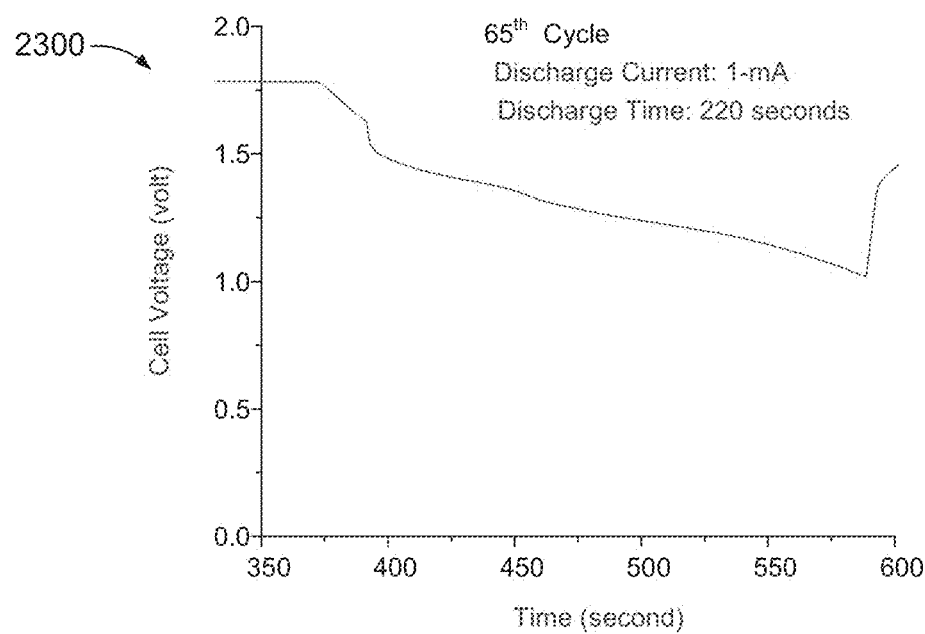
FIG. 23 is a graph of a discharge curve for a $65^{th}$ discharge cycle of the thin-film Ni—Zn battery.

FIG. 23 is a graph 2300 of a discharge curve 2302 for a 65$^{th}$ discharge cycle of the Ni—Zn battery.

Power and generation capacity of the 2.46 mm$^3$ Ni—Zn battery are provided in Table 2.

TABLE 2

| Cell Area (cm$^2$) | Cell Thickness (μm) | Battery Volume (mm$^3$) | Current/Volume Continuous (mA/mm$^3$) | Power/Volume Continuous (mW/mm$^3$) |
|---|---|---|---|---|
| 1.23 | 20.0 | 2.46 | 0.4 to 0.81 | 0.5 to 1.05 |

The 2.46 mm$^3$ Ni—Zn battery may provide current and power values of 1 to 2 mA and 1.2 to 2.6-mW, which corresponds to 0.4 to 0.81 mA, and 0.5 to 1.05 mW, per each millimeter cube of volume of the cell. These values correspond to a power-density of 500 to 1050 W/L, and an energy density of approximately 88 Wh/L.

These values may be increased such, as with increased pore density, which may be obtained with a suitable mask 1202 in FIG. 12. A battery cell may be fabricated with a pore density of up to at least 80%.

Characterizations

Nickel micro tubes, such as illustrated in FIGS. 18 and 19, were analyzed to verify that the tube walls were nickel, and that the contents of the tubes were $Ni(OH)_2$ or NiOOH, rather than a potentially unusable form of nickel. The analysis included XPS and electrochemical techniques.

Figure 24:
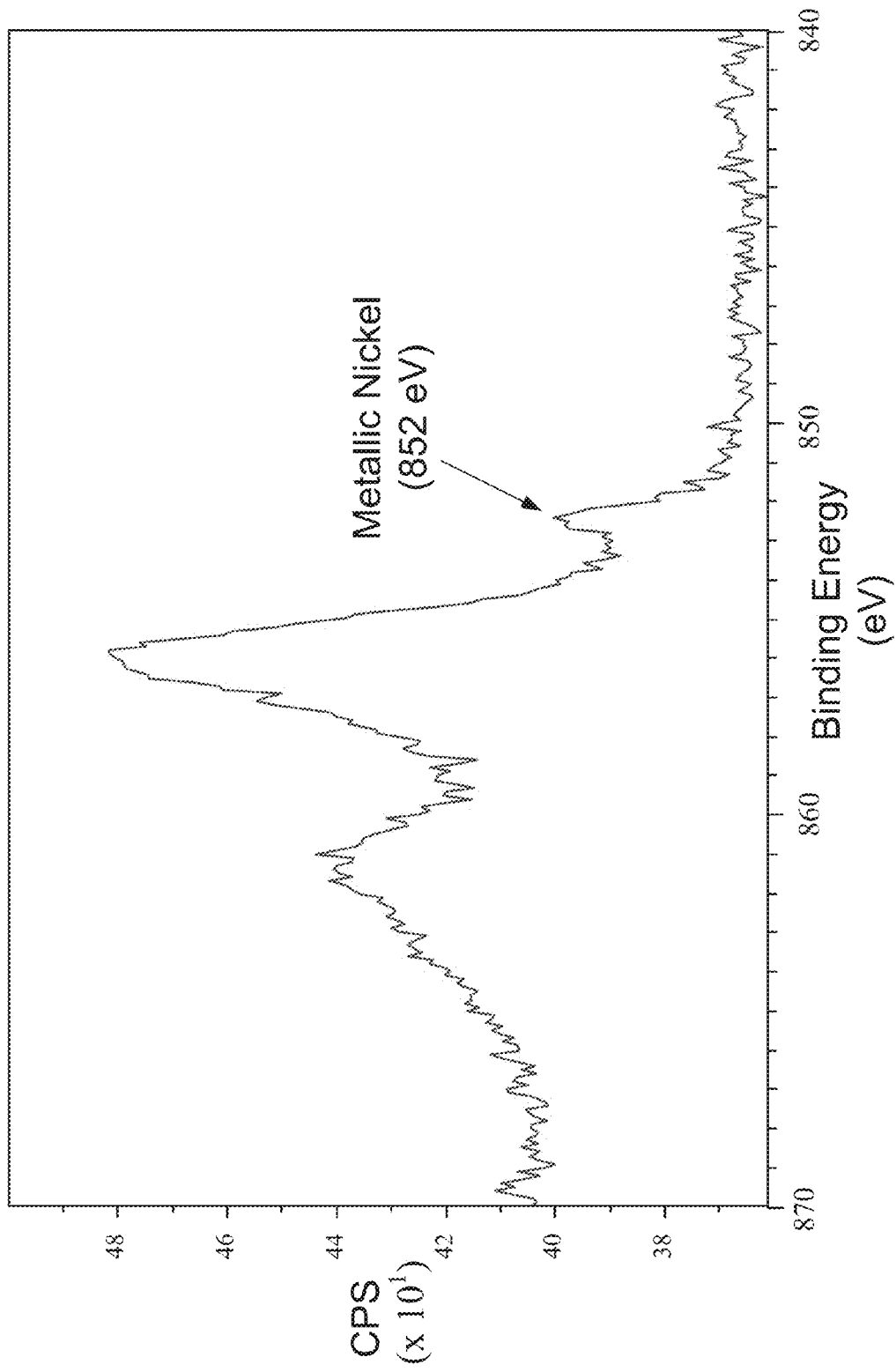
FIG. 24 is a graph of high-resolution X-ray photoelectron spectroscopy (XPS) data of nickel tubes prior to deposition of $Ni(OH)_2$, such as illustrated in FIG. 18.

FIG. 24 is a graph of high-resolution XPS data of nickel tubes prior to deposition of $Ni(OH)_2$, such as illustrated in FIG. 18. A peak at 852 eV confirms that the metal tubes are made of nickel.

Figure 25:
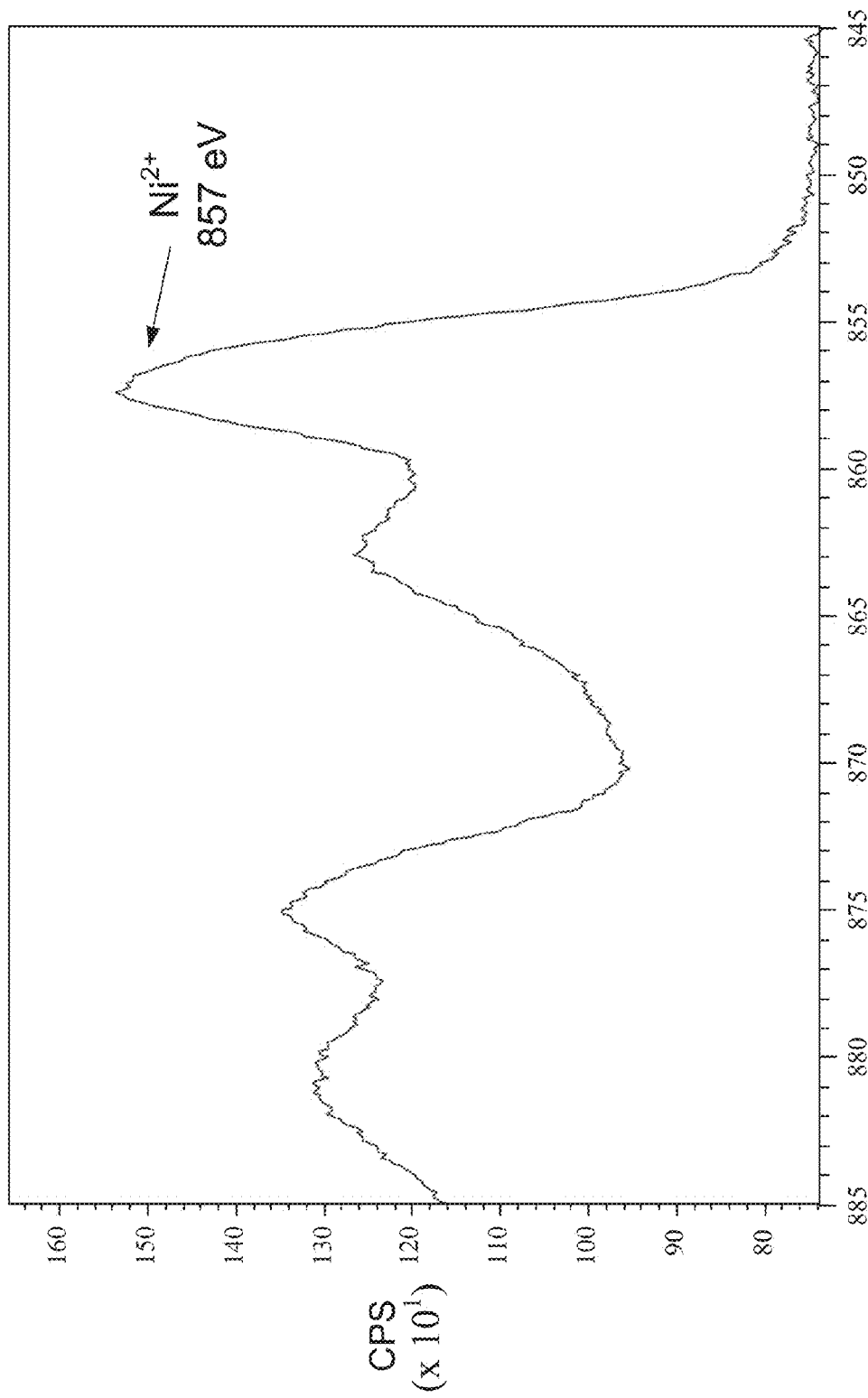
FIG. 25 is a graph of high-resolution XPS data of nickel tubes subsequent to deposition of $Ni(OH)_2$, such as illustrated in FIG. 19.

FIG. 25 is a graph of high-resolution XPS data of nickel tubes subsequent to deposition of $Ni(OH)_2$, such as illustrated in FIG. 19. A relatively sharp peak at 857 eV confirms that the content of the tubes is $Ni(OH)_2$.

Figure 26:
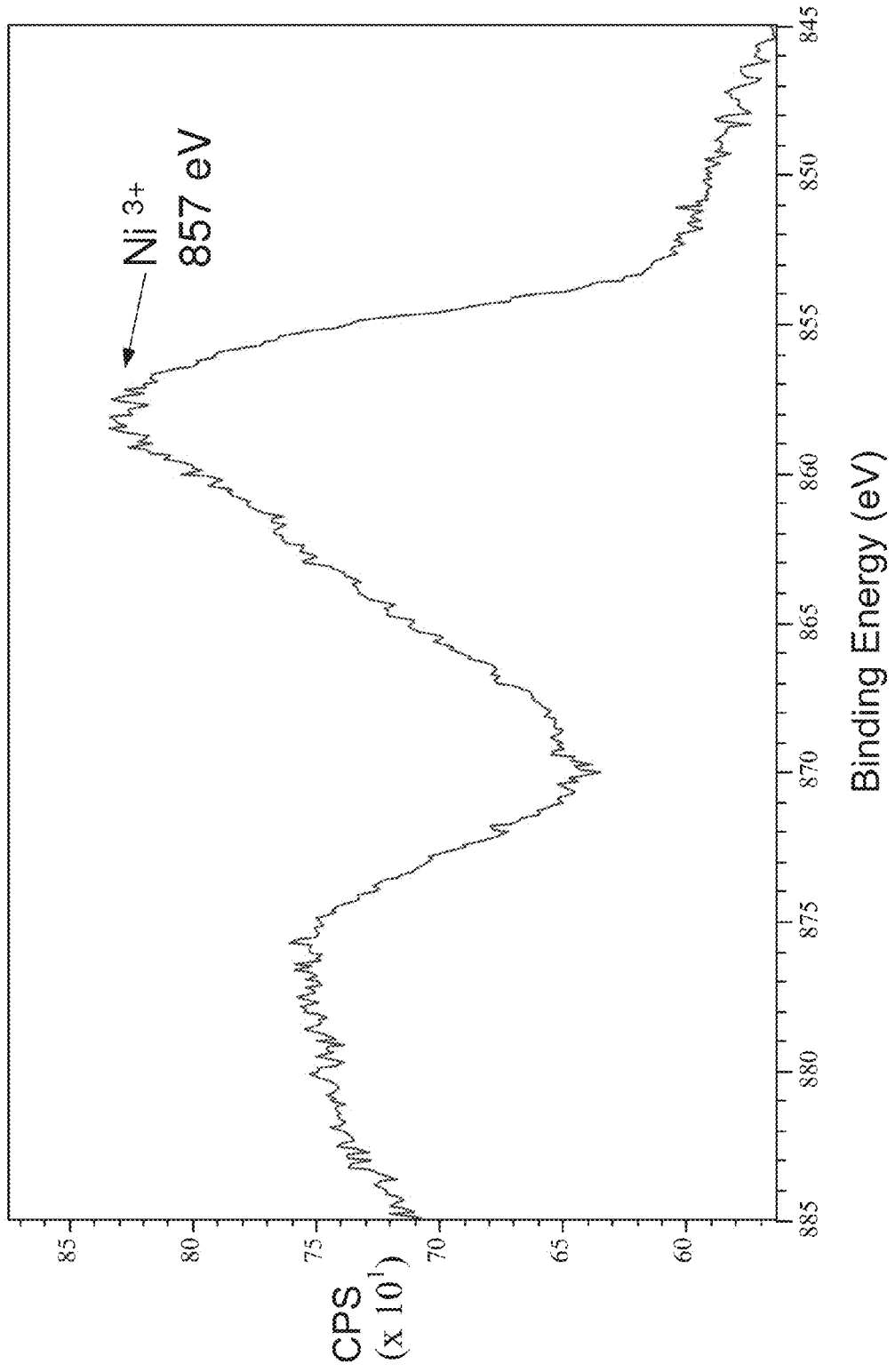
FIG. 26 is a graph of high-resolution XPS data of the nickel tubes of FIG. 19 after converting the $Ni(OH)_2$ to NiOOH.

FIG. 26 is a graph of high-resolution XPS data of the nickel tubes after converting the $Ni(OH)_2$ to NiOOH. A relatively broad peak at 857 eV confirms that the content of the tubes is NiOOH.

A nickel electrode filled with $Ni(OH)_2$/NiOOH was analyzed with respect to electrochemical properties, as described below with respect to FIG. 27.

Figure 27:
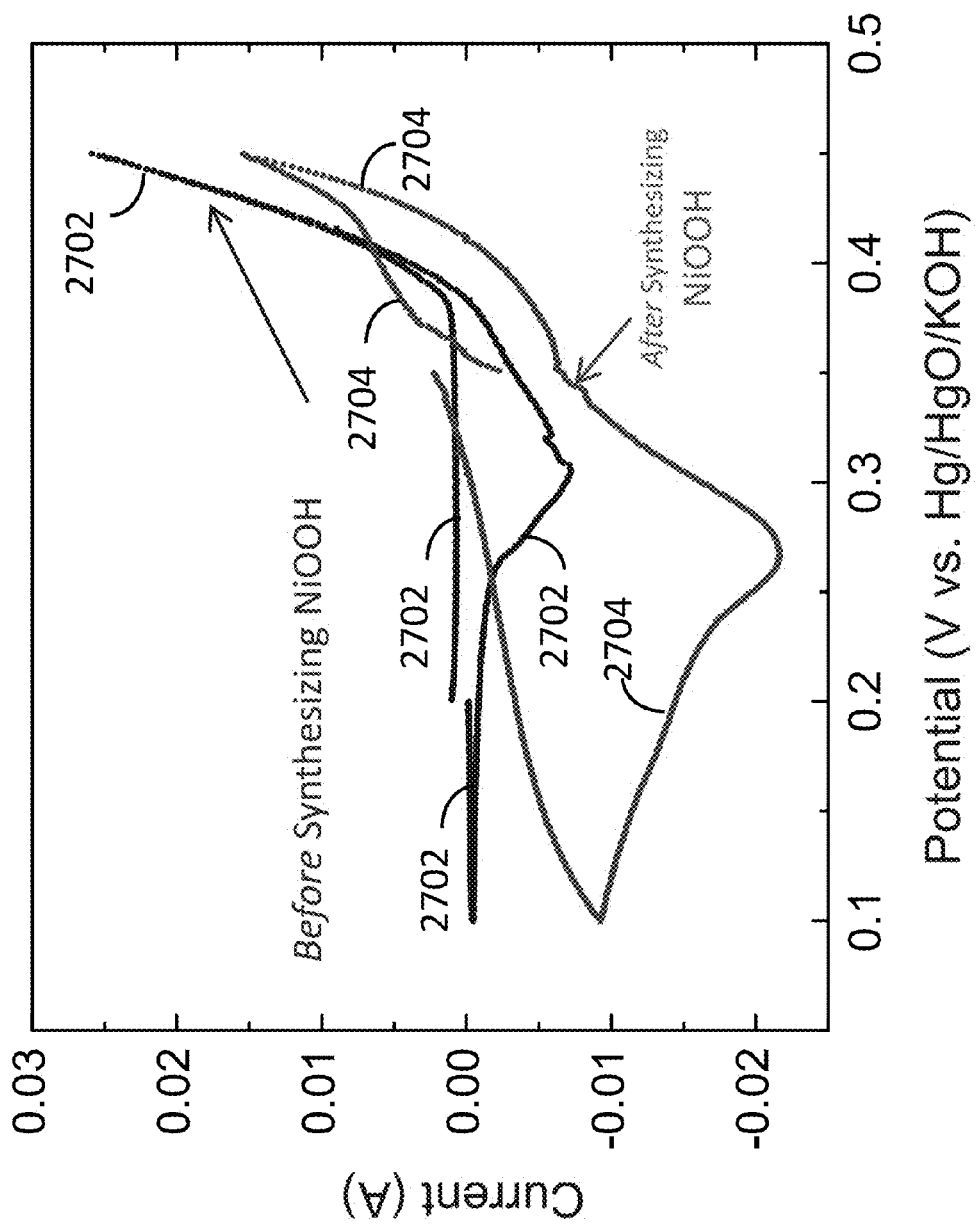
FIG. 27 is a graph of cyclic voltammograms (CVs) of an electrode having a 10 μm thick polycarbonate membrane with 5 μm pores, metallized with nickel and impregnated with $Ni(OH)_2$ and NiOOH, with a pore density of 5%.

FIG. 27 is a graph of cyclic voltammograms (CVs) of an electrode having a 10 μm thick polycarbonate membrane with 5 μm pores, metallized with nickel and impregnated with $Ni(OH)_2$ and NiOOH, with a pore density of 5%.

FIG. 27 includes a first CV 2702 obtained after initial filling of the nickel tubes with $Ni(OH)_2$, and a second CV 2704 obtained after partially oxidizing the $Ni(OH)_2$ to NiOOH. Note that an increase in the amount of NiOOH may lead to an increase in the reduction or discharge current during a cathodic sweep of the voltage.

An open circuit potential of the electrode was measured as +0.35 volts, relative to a Hg/HgO reference electrode, which demonstrates that the chemicals inside the pores are $Ni(OH)_2$ and NiOOH.

Relatively large currents during a voltage sweep of the CV demonstrates that the nickel metallization of the pores helps to conduct electrons toward and away from the $Ni(OH)_2$/NiOOH mixture.

Zinc filled polycarbonate electrodes were also tested using SEM, EDS and electrochemical techniques. The tests confirmed that the electrochemical deposition and impregnation procedures fill the pores in the polymer membrane with zinc, and the electrode functions as a $Zn/Zn(OH)_2$ system.

Cadmium based electrodes were also fabricated and tested.

As noted above, a Ni—Zn battery cell may be more environmentally friendly than a NiCad battery cell, but also pose potential corrosion issues. As further noted above, the potential corrosion issues with zinc were accommodated by metallizing pore walls with copper. With the resultant Ni—Zn battery cell, it was observed that the operating voltage is smaller by about 300 mV. A potential reason for this is discussed below.

The standard potential for reaction of a zinc electrode (see equation (2) above), is −1.35 V, relative to a Hg/HgO reference electrode. Immediately after fabrication, the $Zn/Zn(OH)_2$ electrode had an open circuit potential, $E_{oc}$ of −1.35 V. Two hours later, the $E_{oc}$ settled at −0.9 V, suggesting the electrode potential may have been influenced by the metal used in metalizing the pores in the polymer membrane, namely copper. The drop in the $E_{oc}$ (from −1.35 to −0.9 V) affected the cell potential.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method of fabricating a battery cell, comprising:
   forming first and second electrodes including, for each electrode,
      contacting a metal layer to a first surface of a non-metallic and non-electrically conductive support structure, wherein the support structure includes a second surface opposite the first surface and a cavity defined by a cavity wall that extends between openings through the first and second surfaces, wherein a thickness of the support structure and a corresponding height of the cavity wall is within a range of approximately 1 to 20 micrometers,
      metalizing a portion of the cavity to provide a metal tube within the cavity and in contact with the metal layer, wherein the metal tube includes a metal wall in contact with the cavity wall and having a height less than the cavity wall height,
      depositing an electrochemically active material within the metal tube, and
      depositing an electrolyte within a non-metalized portion of the cavity; and
   coupling the first and second electrodes together with the corresponding support structure second surfaces facing one another and with the corresponding second surface cavity openings at least partially aligned with one another.

2. The method of claim 1, wherein the support structure includes a non-conductive polymer.

3. The method of claim 1, wherein the cavity has a diameter within a range of approximately 4 to 5 micrometers, and wherein the metalizing of the portion of the cavity wall includes:
   metalizing the cavity to a metal tube wall thickness within a range of approximately 50 to 150 nanometers and to the tube wall height within a range of approximately 50% to 80% of the cavity wall height.

4. The method of claim 1, wherein the metalizing of the portion of the cavity, the depositing of the electrochemically active material, and depositing of the electrolyte are performed by electrochemical deposition.

5. The method of claim 1, wherein the forming of the first and second electrodes further includes, for each electrode:
   depositing the metal layer over a substrate;
   spin-coating a polymer over the surface of the metal layer to form the support structure as a polymer film;
   masking the polymer film with a cavity-patterned mask;
   etching the polymer film in accordance with the mask to form the cavity; and
   removing the substrate and the mask.

6. The method of claim 1, further including, coupling the metal layers of the first and second electrodes to a load and providing a current through the load of at least 0.125 milliamperes/cm2 at approximately 1.25 volts for at least 200 discharge/recharge cycles of the first and second electrodes.

7. The method of claim 1, further including, coupling the metal layers of the first and second electrodes to a load and providing a current through the load of at least 1.0 milliamperes/cm2 at approximately 1.25 volts for at least 100 discharge/recharge cycles of the first and second electrodes.

8. The method of claim 1, wherein:
   the metalizing includes metalizing the first electrode cavity with nickel and metalizing the second electrode cavity with copper; and
   the depositing of the electrochemically active material includes depositing one or more of Ni(OH)2 and NiOOH within the first electrode metal tube and depositing one or more of Zn and Zn(OH)2 within the second electrode metal tube.

9. The method of claim 1, wherein:
   the cavity of the support structure includes a plurality of cavities and has a cavity density of at least 4 percent, measured as a percentage of an area of the second surface cavity openings relative to an area of the second surface; and
   the metalizing, the depositing of the electrochemically active material, and the depositing of the electrolyte are performed with respect to the plurality of cavities.

10. The method of claim 9, wherein the cavity density is within a range of approximately 40% to 80%.

* * * * *